US007130266B2

(12) United States Patent
Virtanen et al.

(10) Patent No.: US 7,130,266 B2
(45) Date of Patent: Oct. 31, 2006

(54) HANDLING OF DATA PACKETS

(75) Inventors: Tommi Virtanen, Turku (FI); Riku Salminen, Turku (FI)

(73) Assignee: Stonesoft Oy, Helsinki (FI)

( * ) Notice: Subject to any disclaimer, the term of this patent is extended or adjusted under 35 U.S.C. 154(b) by 817 days.

(21) Appl. No.: 09/955,433

(22) Filed: Sep. 10, 2001

(65) Prior Publication Data

US 2002/0131364 A1    Sep. 19, 2002

(30) Foreign Application Priority Data

Mar. 14, 2001  (FI)  .................................. 20010511

(51) Int. Cl.
*H04L 12/26* (2006.01)
(52) U.S. Cl. ..................................... 370/230; 370/389
(58) Field of Classification Search ................. 370/394, 370/470, 474, 472; 709/201–203, 223–224
See application file for complete search history.

(56) References Cited

U.S. PATENT DOCUMENTS

| | | | | |
|---|---|---|---|---|
| 6,006,259 | A   | 12/1999 | Adelman et al. | 709/223 |
| 6,006,268 | A   | 12/1999 | Coile et al. | 709/227 |
| 6,246,684 | B1* | 6/2001 | Chapman et al. | 370/394 |
| 6,253,321 | B1* | 6/2001 | Nikander et al. | 713/160 |
| 6,772,347 | B1* | 8/2004 | Xie et al. | 713/201 |
| 6,781,992 | B1* | 8/2004 | Rana et al. | 370/394 |
| 2002/0009079 | A1 | 1/2002 | Junack et al. | |
| 2003/0229809 | A1* | 12/2003 | Wexler et al. | 713/201 |

FOREIGN PATENT DOCUMENTS

| | | |
|---|---|---|
| EP | 0 838 930 A2 | 4/1998 |
| EP | WO 99 67930 A | 12/1999 |
| WO | WO 00/33536 | 6/2000 |
| WO | WO 01/33777 A2 | 11/2000 |

OTHER PUBLICATIONS

G. Tsirtsis, et al., "Network Address Translation—Protcol Translation (NAT-PT)" Internet Engineering Task Force, Internet Society, Request for Comments, Network Working Group, Feb. 2000 pp. 1-21, XP015008549, Geneva ,Switzerland.

* cited by examiner

*Primary Examiner*—Chi Pham
*Assistant Examiner*—Rhonda Murphy
(74) *Attorney, Agent, or Firm*—Ronald C. Fish; A Law Corp Ron Fish

(57) ABSTRACT

A method for handling data packets in a network element, such as a gateway, said data packets belonging to a set of data packets. Data packets are captured, and captured data packets are processed. Captured data packets are accepted for processing or declined from processing based on said captured data packet and data packets captured prior to said data packet. When at least one captured data packet is processed, a modification command affecting at least said at least one captured data packet is determined, and a list of modification commands is maintained, said list enabling modification of captured data packets. Captured data packets are modified based on said list of modification commands, and data packets are released. It is also possible to process the captured data packets without determining modification commands, and release the data packets without modifying them.

38 Claims, 14 Drawing Sheets

HANDLING OF DATA PACKETS

BACKGROUND OF THE INVENTION

1. Field of the Invention

The invention relates in general to handling of data packets. Especially, the invention is related to such a method as specified in the preamble of the independent method claims.

2. Description of Related Art

The public networks are presently being used more and more for sensitive and mission critical communications and the local networks of various organisations and enterprises are nowadays connected to public networks, one of them being the Internet. Since the basic mechanisms of the public networks were not originally designed with secrecy and confidentiality in mind, the public networks are untrusted networks. To protect a local network, a special network element is usually used to connect the local network to a public network. Typically such network element monitors the connections traversing the network element and possibly modifies the data packets of the connections (contents of the data packets) according to predetermined rules. Methods such as network address translation (NAT) and protocol conversions are methods requiring that the data packets are modified in such network elements. Also other modifications on the data packets traversing the network element may be performed. This kind of gateway is often called a security gateway or a firewall.

Data packets of communication connections contain information fragments, which form the data stream communicated from one end of a communication connection to the other end of the communication connection. Typically, a data packet contains a payload part and a header part. The payload part contains the actual data and the header part contains some information fragments concerning connection or packet related information, such as the destination address of the packet.

One widely used protocol in communication networks is TCP (Transmission Control Protocol). TCP is generally classified as a reliable connection oriented protocol including procedures such as retransmissions and acknowledgements. In TCP, octets of data (information fragments of the payload part of a data packet) are numbered sequentially, and the receiving end of a connection acknowledges the data received by means of the sequence number of the data received. A sequence number in TCP is a 32-bit unsigned number that wraps around back to 0 after reaching $2^{32}-1$. The sequence numbers of data contained in a data packet are indicated in header part of the data packet. This is an example of the above mentioned packet related information.

Typically, above described security gateway includes specific code portions, which are processes taking care of various modifications according to different protocols. Additionally, such process may assist the security gateway software with content filtering or network address translation tasks. One security gateway may contain several such code portions, for example one for every supported protocol. Such specific code portion may be part of the security gateway software or a separate program and it may be called for example a protocol agent or a service helper.

One widely used method for handling connections in a security gateway is to direct the connections to a proxy process. In general, a proxy can be interpreted as a special integration of a server and a client: proxy acts as a server towards an actual client and as a client towards an actual server. FIG. 1a illustrates a simplified example with a client C connected to a server S via a security gateway 100 operating as a proxy 101. Proxy 101 communicates with the client C via a first connection 104, and with the server S via a second connection 106. Proxy reads a data stream assembled from the packets 102' of the first connection 104 received from the client C, interprets the requests (the data stream or information fragments) therein and either answers the requests itself or sends the requests in packets 108 of the second connection 106 to the server S. Proxy 101 may modify the requests of the packets 102' received from the client C, before sending the requests to the server in packets 108. In addition, the proxy 101 may process the information fragments contained in multiple packets 102' received from the client C, before deciding how to handle the request(s) therein and before sending possible requests to the server in packets 108.

The advantage of proxy is that it is easy to implement and flexible. For example, if proxy 101 notices that a client C tries to request a denied resource, it does not send the request via the second connection 106 to the server at all, but it answers the request by sending an error message to the client via the first connection 104. In this way, the server S does not see the request at all. In some cases, the proxy does not even need to open the second connection 106 to the server S.

Nevertheless, a proxy can be considered a slow and not very scalable process. It is most commonly implemented as a user space application, and user space applications are slow (in contrast to kernel space applications). As the amount of traffic in communication networks is large, it is very important to have security gateways that handle the connections efficiently and do not cause large delays. In proxy implementation there are always two connections, even if no modifications are required on the data stream traversing the security gateway. If for example TCP connections going through a proxy are considered, two separate connections require a significant amount of data storage and processing. In case of a proxy implementation, the procedures of TCP have to be included both in the connection from the client to the proxy and in the connection from the proxy to the server. Additionally, proxy is never completely transparent, since the data packets 102, 102' of the first connection are always different than the data packets 108 of the second connection, even if the original data stream was not modified.

Due to high availability requirements a security gateway may be clustered, i.e. a security gateway may consist of several security gateway nodes, which serve as backup nodes to each other or between which the load handled by the cluster may be balanced. A requirement in such implementations is that one should be able to transfer connections from one node to another. That is, it should be possible that a second node continues to handle a connection previously handled by a first node, for example if the first node is not able to continue to handle the connection. Furthermore the transfer should be transparent to the users of the communication connections.

If the connections go through a proxy it is very difficult to transfer the connection without losing some information. Consider for example a TCP communication connection going through one node of a security gateway cluster. The first connection from the client terminates at the proxy. When proxy receives a packet it sends to the client an acknowledgement for the packet. This way the client knows that it does not need to retransmit the packet. However, as was stated before, proxy may not process the packet right away. If the node handling the connection fails at this point, before proxy processes the packet, the information in that packet is lost, even though the connection would be transferred to another node, since the that packet is not saved anywhere else than in the proxy and the client already received an acknowledgement for that packet. To avoid this situation, all received data packets should be copied also to other nodes of the security gateway cluster before sending an acknowledgement to the client. This on the other hand would create a huge amount of additional traffic between the nodes of a cluster. Thus, it may not be reasonable to even try to transfer connections handled by a proxy.

Another method for handling communication connection in a security gateway is to process data packets on the fly, packet-by-packet. This method is not very suitable for handling TCP connections, but it is used for TCP as well. FIG. 1B illustrates a client C connected to a server S via a security gateway 110 handling the data packets of the connection between the client C and the server S on a packet-by-packet basis. There is one connection 114 going from the client to the server. In the security gateway 110, there is an agent 112, which takes care of monitoring and modifying the data stream of one packet 116 at a time. Typically, this agent 112 is a specific software code portion, which captures a packet 116, monitors if the data stream therein contains anything that should be modified, modifies the data if necessary and then releases the packet.

Due to modifications the length of the data stream contained in a packet may change. For example, the original data stream may comprise 5 octets of data and after the modification the data stream may comprise 8 octets of data, resulting in a sequence number offset between the original and modified data stream to be 3. The agent 112 stores the offset of the sequence numbers due to the modifications, so that it can modify the acknowledgements accordingly. The agent 112 stores knowledge such as: "At sequence number 532, I made a change in the data stream that caused the sequence number offset between the original and modified stream to be 3. Before this modification, there was no offset (no modifications have been done to the data stream yet)." For example notation like (sequence number, old offset, new offset) may be use. In this situation, this results in notation (532, 0, 3). Later, this knowledge is used for fixing the sequence numbers of the acknowledgements. Acknowledgements for all sequence numbers$\geq$532 have to be fixed.

The advantage of this approach is higher throughput and efficiency in comparison to proxy solutions, since there is only one connection 114 and the agent 112 processes the packets on the fly.

The problem relating to this approach is reliability. The method operates correctly only under certain circumstances. Consider for example the above described situation with a modification at sequence number 532. The agent remembers that the sequence number offset between the original and modified stream is 3 after the sequence number 532 and acknowledgements for the sequence numbers$\geq$532 have to be fixed by offset of 3 and acknowledgements for the sequence numbers<532 do not need to be fixed. Then, another modification is done at sequence number 1000, resulting in the sequence number offset between the original and modified stream to increase by 2. Now, notation (1000, 3, 5) is stored and the previous one (532, 0, 3) is erased, if the system stores knowledge of only one modification at a time. This means that acknowledgements for the sequence numbers$\geq$1000 are fixed by offset of 5 and acknowledgements for the sequence numbers<1000 are fixed by offset of 3. What happens to an acknowledgement that acknowledges the sequence number 500? It gets fixed by offset of 3, which clearly results in incorrect acknowledgement. Typically, knowledge of only a small, limited number of modifications is stored at a time, and only a change in the length of the data stream results in storing any knowledge of the modifications.

Another situation causing problems is retransmissions. For example TCP includes functionality of retransmissions in case of a packet is not received at the receiving end. Now, it is possible that for example a packet 118 from the client has traversed the security gateway normally and the agent 112 has modified the data stream in the packet and stored knowledge about possible sequence number offset. The modified packet 118 is received at the server S but for some reason the client C resends the same packet, packet 116 being the resent packet. The reason for resending the data is typically that the acknowledgement for the packet 118 is lost or a timeout has occurred at the client C before receiving the acknowledgement for the packet 118. When the agent 112 sees the resent packet 116 it does not know that it has already processed this packet and may mix the bookkeeping of the sequence number offsets when processing the packet 116. Consider for example the modifications of the previous example. Let the packet 118 (and 116) to contain the sequence number 532. When the packet 118 was processed, a notation (532, 0, 3) was stored. Then, a packet containing the sequence number 1000, was processed and a notation (1000, 3, 5) was stored. After this, the packet 116 also containing the sequence number 532 is processed. Now the agent 112 knows that the sequence number offset so far is 5 and processing the packet 116 results in storing notation (532, 5, 8). It is clear that in this situation the bookkeeping of the sequence number offsets gets mixed. Additionally, the data streams of the packets 116 and 118 may be modified differently, since there is no knowledge about the modifications made to the data streams.

A still further weakness of the prior art packet-by-packet system is that as the agent processing the data streams always sees one packet at a time, commands that extend to more than one packet are likely to be misinterpreted. This way, it is possible that a packet that should have been modified is let go through without any modifications, or alternatively, a perfectly legal connection may fail due to a packet or packets being dropped.

Considering clustered security gateways, the connections going through this kind of packet-by-packet agent may be easily transferred from one node to another, since the modifications are basically based on the contents of one packet at a time. But due to the disadvantage of low reliability, this approach is not suitable for mission critical environments.

Until nowadays, typical security gateways have been designed to operate merely as single nodes, and clustering requirements have not been emphasized. In a typical security gateway cluster, information about ongoing connections is stored in a connection data structure and the stored information is synchronized between nodes of the cluster in order to enable transferring a connection. The information includes typically source and destination addresses and source and destination ports of the connection and an individual packet of a connection can be identified on the basis of this information. Traditionally this has been understood as a state of the connection. Additionally, if a first connection is handled by a first specific code portion in a first node, the first connection can be transferred to a second node only if the second node also contains a specific code portion similar to the first specific code portion for handling the first connection. At the time of writing this application high availability and clustering are however becoming more and more important issue.

On the basis of above description there is clearly a need for a method for handling data packets, which is both reliable and suitable for clustering at the same time.

SUMMARY OF THE INVENTION

It is the object of the invention to present a flexible and reliable method for handling data packets. A further object is to present such method for handling data packets, which mitigates problems encountered in clustering network elements handling data packets.

Objects of the invention are achieved by capturing data packets, which may arrive in an arbitrary order, and by accepting a captured data packet for processing or declining a captured data packet from processing based on said captured data packet and data packets captured prior to said data packet. When a captured data packet is processed, a modification command affecting at least said captured data packet is typically determined, and a list of modification commands is maintained for enabling modification of said captured data packet and also further captured data packets. The captured data packets are modified based on said list of modification commands, and modified captured data packets are released. It is also possible to process the captured data packets without determining modification commands, and release the data packets without modifying them. This approach is suitable for example when it is desired to only monitor the data packets, which is desired for example in intrusion detection systems or other systems that are quietly monitoring packet data traffic but do not participate in the communication.

The invention is characterized by that which is specified in the appended independent claims. The appended dependent claims describe some preferred embodiments of the invention. The features described in one dependent claim may be further combined with features described in another dependent claim to produce further embodiments of the invention.

The invention is primarily aimed for security gateways, firewalls or any kind of similar network elements, which handle data packets and need to process the contents of data packets. Processing may involve modifying the contents of data packets or just monitoring the contents of data packets. Typically such devices operate in a communication network, the network being based on either fixed line connections or wireless links between communicating parties.

The invention is applicable for handling of data packets concerning any protocol, where the data packets belong to certain sets. Typically a communication connection forms such set of data packets. For example, it is possible that data packets need to be handled in certain order or in certain subgroups in order to construct the original data stream and in order to be able to interpret the data stream reliably. For example, a certain packet B can be processed only after a packet A has been processed and a packet C can be processed only after the packet B has been processed, or certain packets D, E and F need to be processed at the same time. The invention is especially well suited for handling TCP based communication sessions. In contrast to TCP, UDP (User Datagram Protocol) sessions are generally classified as connectionless transmission of data, where data packets do not have relations to each other and are processed as independent packets. Nevertheless, the invention can be applied to protocols that are based on UDP, in case they are protocols, which contain the concept of either grouping or ordering of data packets.

The idea of the invention is to process data in a certain order specified by the structure of the set of data packets to be processed and to process data only once. The term structure of the set of data packet refers to dependencies between the data packets of the set. Typically data packets are originally sent in the correct order, but the order of data packets may change on the way and they may be received in any arbitrary order. In order to construct the original data stream contained in the data packets the data packets need to be rearranged into the correct order. The structure of a set of data packets defines the correct order of the data packets.

When data is processed modification commands are determined, if data needs to be modified, and data is modified according to the modification commands. If same data needs to be handled more than once, it is not required to process the data again, but the modification commands obtained, when the data was handled the first time, may be used. Therefore, a modification command needs to include enough information for performing modification of a present captured data packet and future captured data packets. Clearly, this means that more information needs to be stored than in prior art packet-by-packet method, since in prior art only the point of a modification is stored and all captured data packets are processed regardless of whether they contain data that is already processed. On the other hand, the invention simplifies processing of data.

The invention also provides a whole new approach for transferring communication connections from one node of a network element cluster into another node of said network element cluster. A reason for transferring a connection may be for example that the node handling the connection fails or starts a procedure to go to offline state. Additionally, the transfer may be done for load balancing purposes.

Data packets of a communication connection are typically processed by a specific code portion. In prior art solutions such specific code portion typically processes data packets according to one specific protocol, but data packets of several connections according to that specific protocol may be handled by the same specific code portion. According to an aspect of the invention such specific code portion processes data packets according to one specific protocol similarly with prior art solutions, but one specific code portion is logically assigned to handle one single communication connection. Thus, every open connection has its own specific code portion assigned especially to that connection. The specific code portion has a connection dependent state which comprises the modification commands affecting at least one data packet of the connection and when the communication connection is transferred, the specific code portion is logically transferred with the connection.

As was stated before, prior art solutions are based on handling a communication connection in a first node by functionality included in the first node. If the communication connection is then transferred to a second node, the handling of the connection is continued by the functionality included in the second node. Clearly the first node and the second node need to include the same functionality for handling the communication connection. According to an aspect of the invention, the functionality required for handling a definite communication connection is logically transferred from one node to another node with the connection. Thus, in contrast to prior art node specific code portions, the invention presents a connection specific code portion.

BRIEF DESCRIPTION OF THE DRAWING

The invention is now described in more detail with reference to the accompanying drawing, where.

DETAILED DESCRIPTION OF THE INVENTION

Figure 1A:
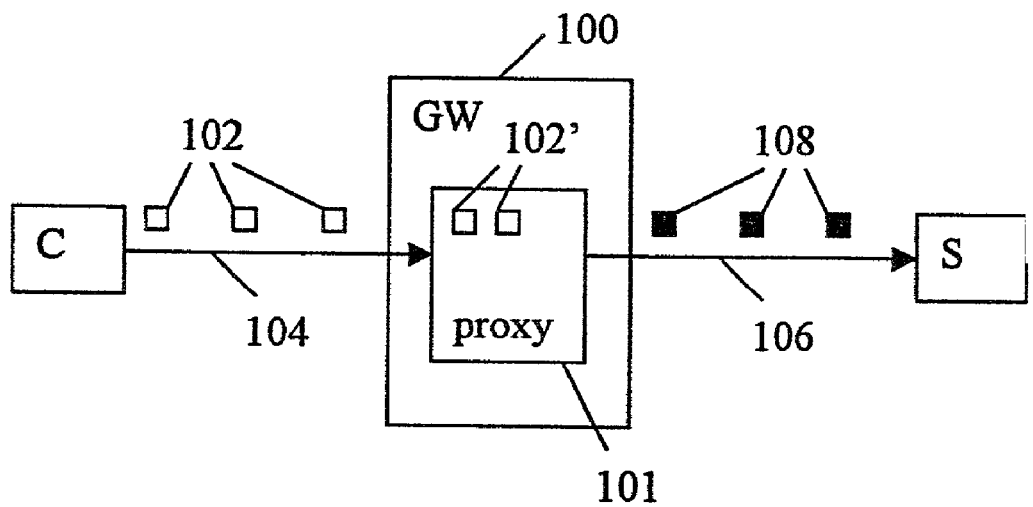
FIG. 1A illustrates a client connected to a server via a security gateway operating as a proxy.
Figure 1B:
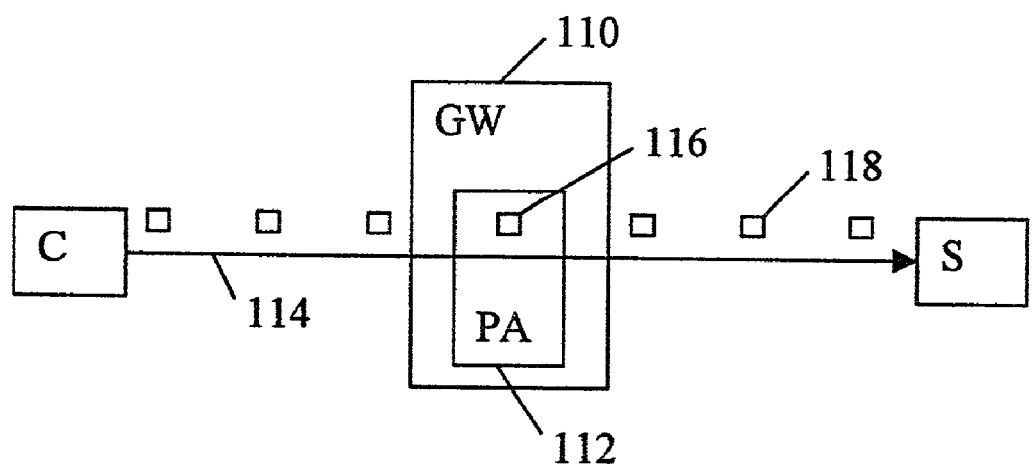
FIG. 1B illustrates a client connected to a server via a security gateway handling the data packets of the connection between the client and the server on packet-by-packet basis.

FIGS. 1A and 1B are discussed in more detail above in connection with the prior art description.

Figure 2:
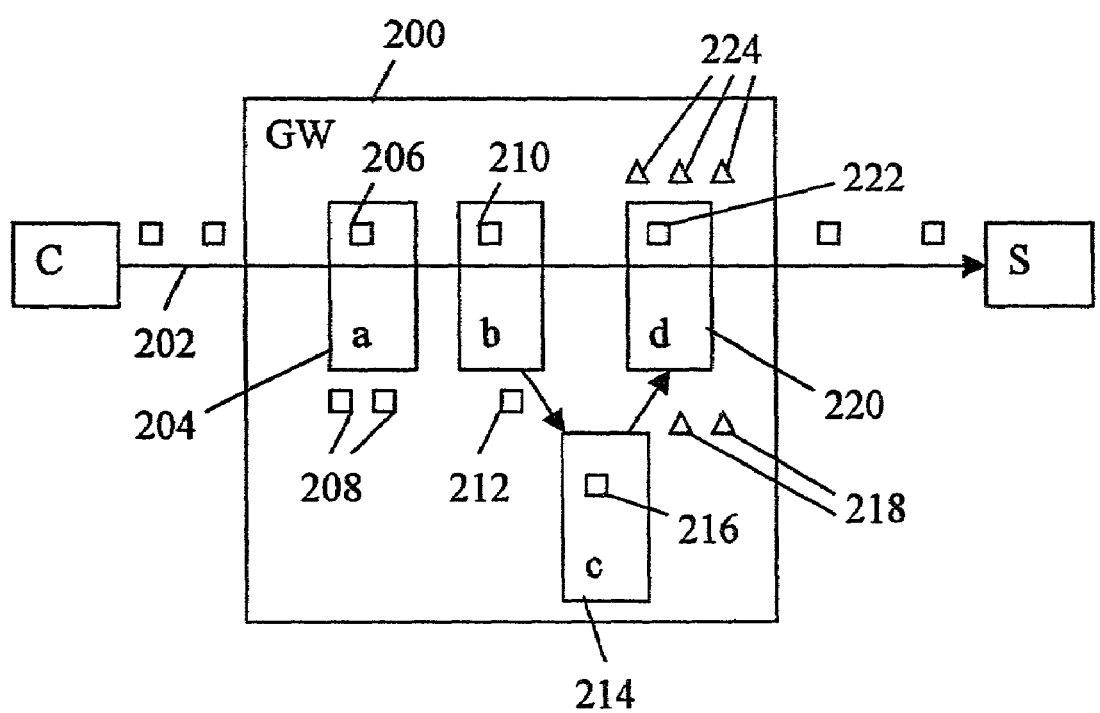
FIG. 2 illustrates a client connected to a server via a security gateway handling the data packets of the connection between the client and the server according to a method of the invention.

FIG. 2 illustrates a client C connected to a server S via a security gateway 200 handling the data packets of the connection between the client C and the server S according to a method of the invention. There is one connection 202 going from the client C to the server S and the security gateway 200 handles the packets on the fly. The handling process inside the security gateway is here divided into four stages a–d for the sake of clarity. This is not the only possible order of the stages, but they can be ordered in any suitable way with the restriction that the modification commands need to be obtained before they can be applied, i.e. the data stream can be modified. In fact some of these stages can be merged together or some stages may be divided into further stages. A different packet is presented in all the stages in FIG. 2 in order to illustrate the possibility to handle several packets simultaneously within different stages of the gateway element, however each stage is able to handle only one packet of a set of data packets at a time. Nevertheless, it is possible that only one packet is handled at a time within the security gateway and a next packet is handled only after the previous one has been released. Furthermore, several sets of data packets may be handled in parallel.

In the stage a, a packet 206 is captured, and it is checked if the content of the packet can be processed. The decision is based on this captured packet and packets captured prior to this captured data packet. If the content of the packet can be processed, the packet continues to the stage b. If the content cannot be processed, the packet 206 is discarded or delayed, delaying concerning putting the packet into queue 208. In the stage b, it is checked, if a packet 210 contains data that has not been processed. If yes, such data from the packet 210 is transferred to the stage c in a data stream 212. The data stream 212 may contain all data from the packet 210 or only part of the data. The packet 210 continues to the stage d.

The stages a and b together implement the primary step of the invention of accepting a captured packet for processing or declined a captured packet from processing based on the captured packet and packets captured prior to this captured data packet.

In the stage c, data stream 216 is processed according to predetermined rules. Advantageously, this is done by a specific software code portion. If the data stream needs to be modified, the processing results in modification commands 218 concerning the processed data stream. These modification commands 218 are passed to the stage d. In the stage d, the modification commands 218 obtained from the stage c are stored. A packet 222 is modified according to the stored modification commands 224 concerning the data streams of the packet 222, if there are such modification commands. Then the packet 222 is released.

Figure 3:
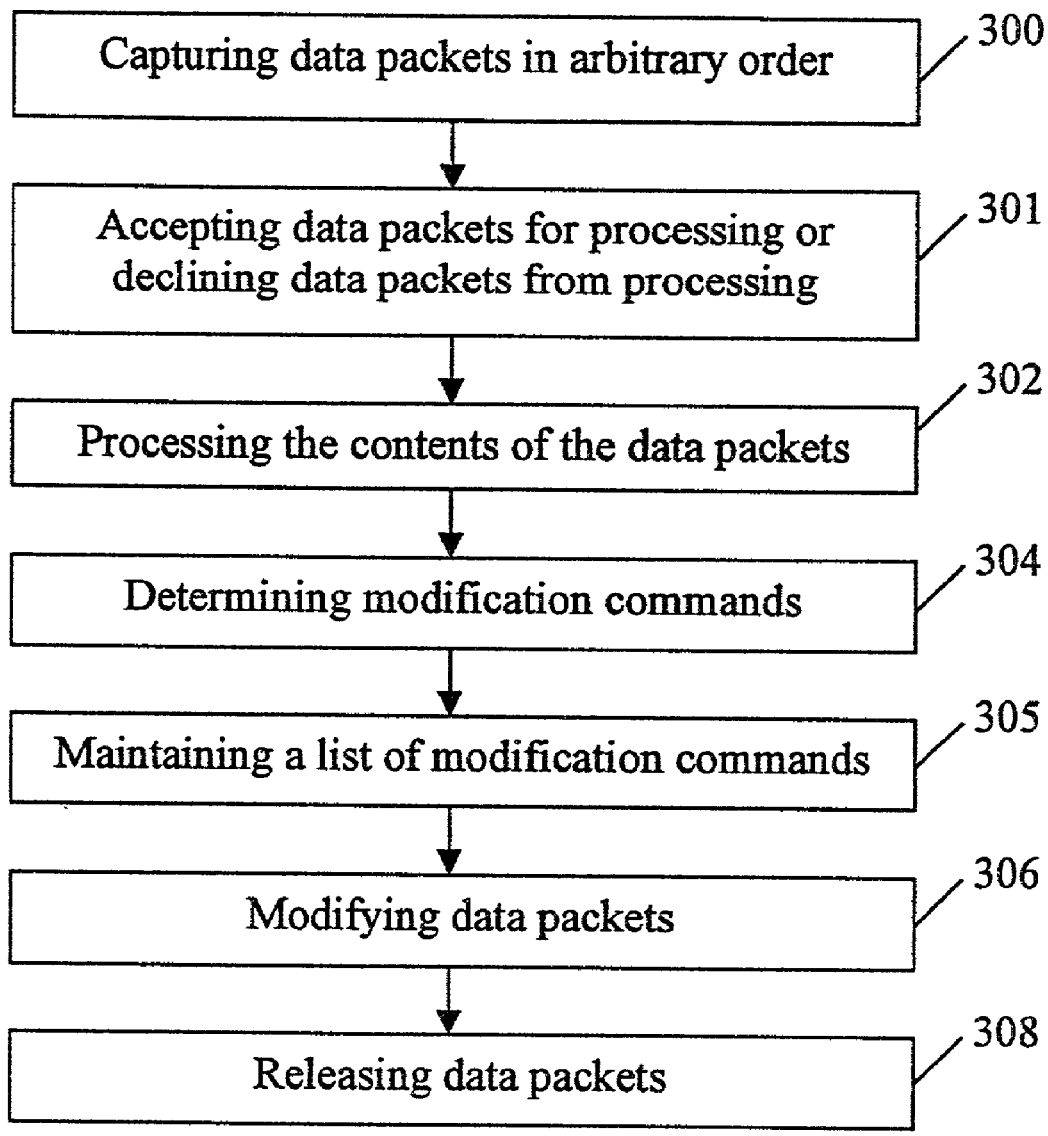
FIG. 3 illustrates as an example a flowchart of a method according to the invention.

FIG. 3 illustrates as an example a flowchart of a method according to the invention. In step 300, data packets are captured in arbitrary order. Typically the packets are originally sent in the correct order, but due to unreliability of physical communication networks some packets may be lost or some packets may be delayed on the way for some reason. Therefore, it is common that data packets are received in arbitrary order.

In step 301, it is decided whether to accept a data packet for processing or to decline the data packet from processing, the data packet being a data packet of a certain set of data packets. The decision is based on said data packet and data packets of said certain set of data packets captured prior to said data packet. If the data packet is accepted for processing, the contents of the data packet is processed in step 302. Knowledge of accepted data packets of a certain set is maintained for being able to accept or decline future data packets of said certain set. If data packets of a set are for example sequentially numbered it is enough to maintain the sequence number of the data packet that was processed most recently. Captured data packets may be then easily classified as either acceptable or unacceptable for processing by comparing the sequence number of the most recently processed data packet and the sequence number of the captured data packet. In step 304, modification command(s) is(are) determined. The modification command(s) affect the contents of the data packet processed in step 302. Primarily the modification command(s) affect the specific data packet processed in step 302. A modification command may affect also other packets concerning the contents of said specific data packet 302, such as a data packet acknowledging the contents of the data packet 302. The modification commands are further discussed later in this document.

In step 305, a list of modification commands is maintained in order to enable modification of present and future data packets. The data packets are modified according to the list of modification commands in step 306 and modified data packets are released in step 308.

The method of FIG. 3 is applicable also without the concept of determining modification commands and modifying the data packets. If it is not required to modify the data packets they may be released straight after the step of processing.

FIGS. 4 and 5 present various different aspects of the invention. Different and possibly optional details of the invention are described by means of flowcharts. Not all of the flowcharts include all the steps that are necessary for implementing the invention as a whole, but the features of various flowcharts may be advantageously combined in any suitable way.

Figure 4A:
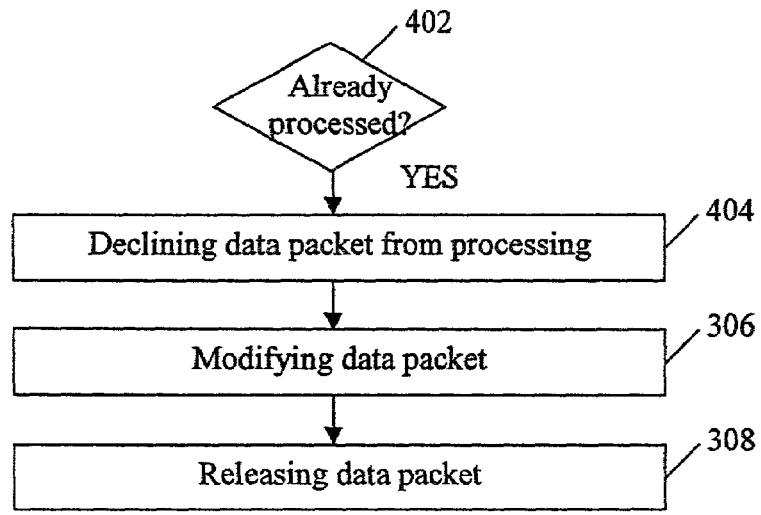
FIGS. 4A, and 4B illustrate as examples methods of accepting or declining data packets.
Figure 4B:
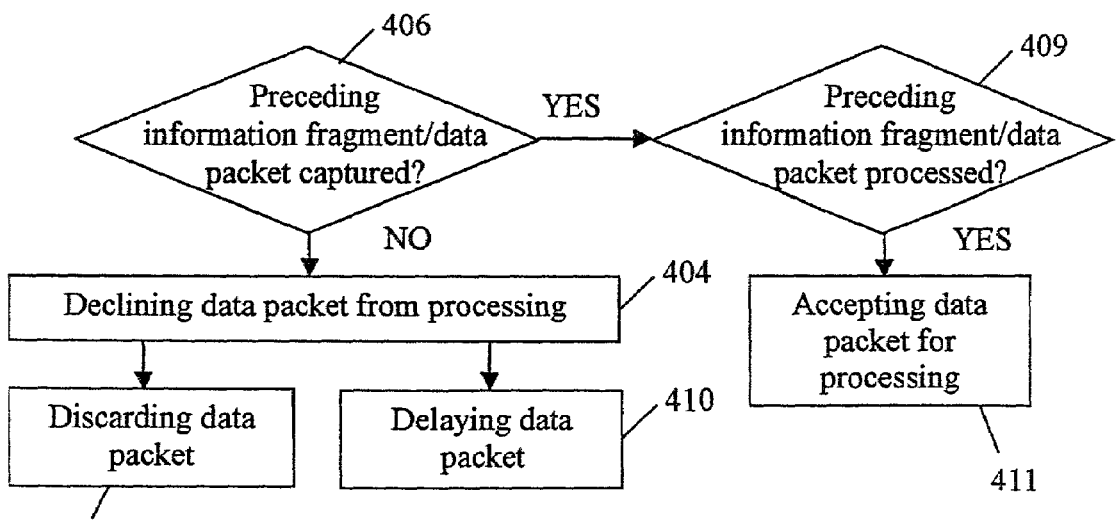

FIGS. 4A and 4B illustrate as examples methods of accepting or declining data packets in more detail.

FIG. 4A illustrates as an example a flowchart of declining a data packet, which is already processed, from processing. In step 402, it is checked if the data packet or the contents of the data packet is already processed. If yes, the data packet is declined from processing in step 404. Then the data packet is modified according to the list of modification commands in step 306 and the modified data packet is released in step 308. It is possible to proceed straight to the modifying step (step 306), since the data packet is already processed, and therefore modification commands affecting this particular data packet are already included in the list of modification commands. In this way data packets or the contents of data packets are processed only once.

FIG. 4B illustrates as an example a flowchart of accepting or declining modification of a data packet, which is not yet processed. The method is applicable for handling data packets containing information fragments belonging to a sequence of information fragments or for handling data packets belonging to a set of data packets having at least partly hierarchical structure. In step 406 a captured data packet and data packets captured prior to said data packet are compared. Typically the comparison is done implicitly, on the basis of knowledge about the previously captured data packets. If it is detected, that a data packet containing the information fragment immediately preceding the information fragments of said captured data packet in said sequence of information fragments or a data packet immediately preceding said captured data packet in said at least partly hierarchical structure is not yet captured, said captured data packet is declined from processing in step 404. Then, said captured data packet is discarded in step 408 or delayed in step 410. Delaying a data packet means putting a data packet on a hold until it can be accepted for processing in a later phase. Accepting delayed data packets for processing is described later in this document. If it is detected, that a data packet containing the information fragment immediately preceding the information fragments of said captured data packet in said sequence of information fragments or a data packet immediately preceding said captured data packet in said at least partly hierarchical structure is already processed, said captured data packet is accepted for processing in step 411.

Advantageously, the information fragments of captured data packets are processed in the order specified by said sequence of information fragments, if captured data packets contain such information fragments. Sequentially numbered octets of TCP are one example of a sequence of information fragments, however octets of a TCP connection are only implicitly numbered, i.e. the octets are not numbered as such, but within a communication connection the octets are referred to by means of sequence numbers. An at least partly hierarchical structure according to which data packets are arranged may be for example a numbered sequence of data packets or a hierarchically structured tree of data packets. Alternatively, the set of data packets may include a plurality of groups of data packets. Advantageously, captured data packets are accepted for processing in the order specified by said at least partly hierarchical structure or in groups of data packets.

FIGS. 5A, 5B, 5C and 5D illustrate as examples further methods of accepting or declining data packets. Especially example methods for accepting delayed data packet for processing are presented. The term delayed data packet refers to a captured data packet, which is declined from processing and delayed at the moment of capturing said data packet. In principle handling of only one delayed data packet is incorporated in the flowcharts, but the processes described are typically repeated for all delayed data packets.

Figure 5A:
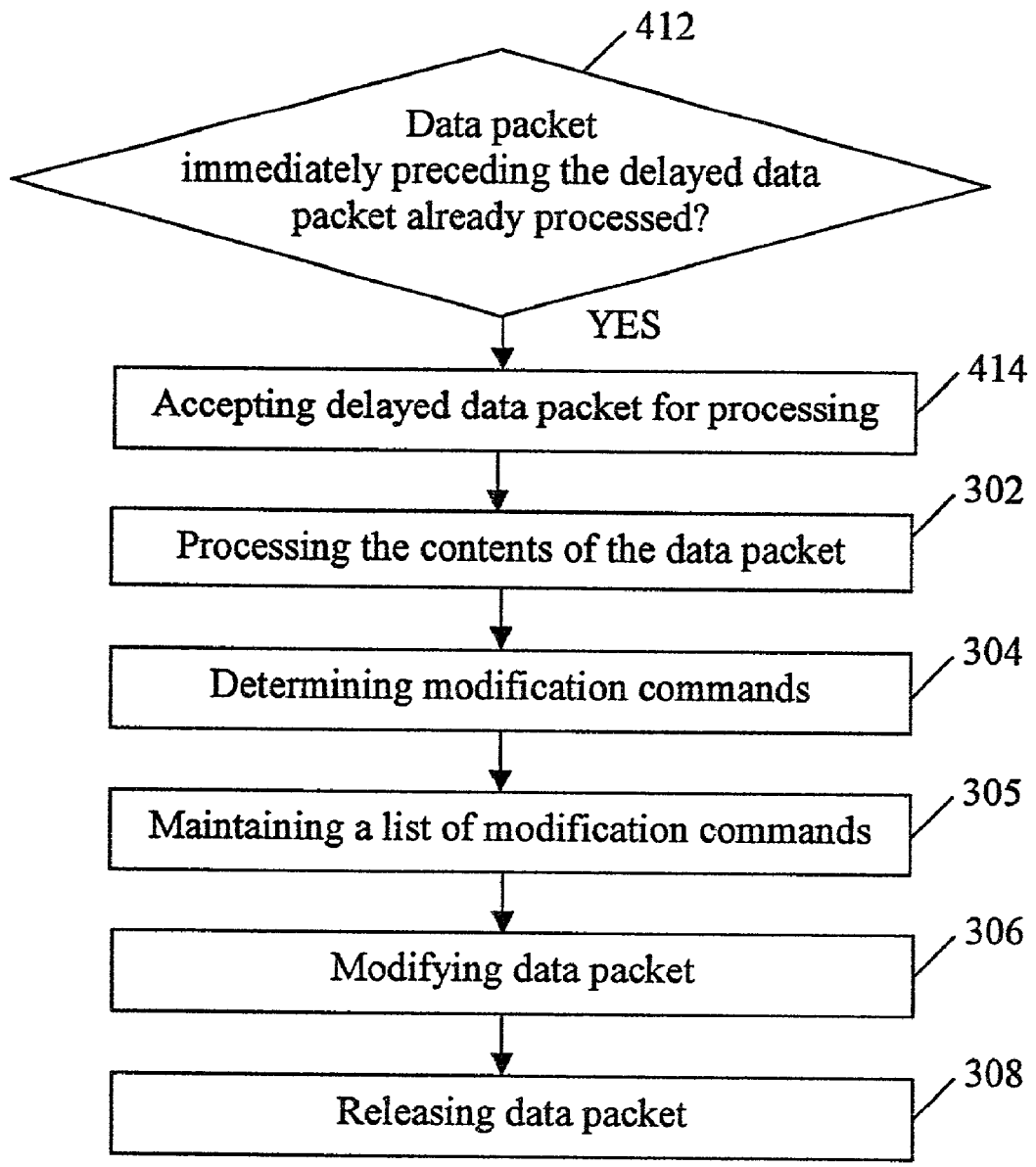
FIGS. 5A, 5B, 5C and 5D illustrate as examples further methods of accepting or declining data packets.

FIG. 5A illustrates as an example a flowchart of a method for accepting a delayed data packet for processing. The method is applicable for handling data packets containing information fragments belonging to a sequence of information fragments or for handling data packets belonging to a set of data packets having at least partly hierarchical structure. In step 412 a delayed data packet and data packets processed prior to said data packet are compared. Typically the comparison is done implicitly, on the basis of knowledge about the previously processed data packets. If it is detected, that the information fragment immediately preceding the information fragments of said delayed data packet in said sequence of information fragments or the data packet immediately preceding said delayed data packet in said at least partly hierarchical structure is already processed, the delayed data packet is accepted for processing in step 414. It is possible to accept several delayed data packets for processing at the same time, if the structure of the set of data packets allows accepting several data packets at a time. One such structure is a tree structure, in which processing of several data packets may be enabled by processing one upper level data packet.

The contents of the delayed data packet is then processed in step 302. In step 304, modification command(s) is(are) determined, and a list of modification commands is maintained in step 305. The delayed data packet is modified according to the list of modification commands in step 306 and the modified data packet is released in step 308.

Figure 5B:
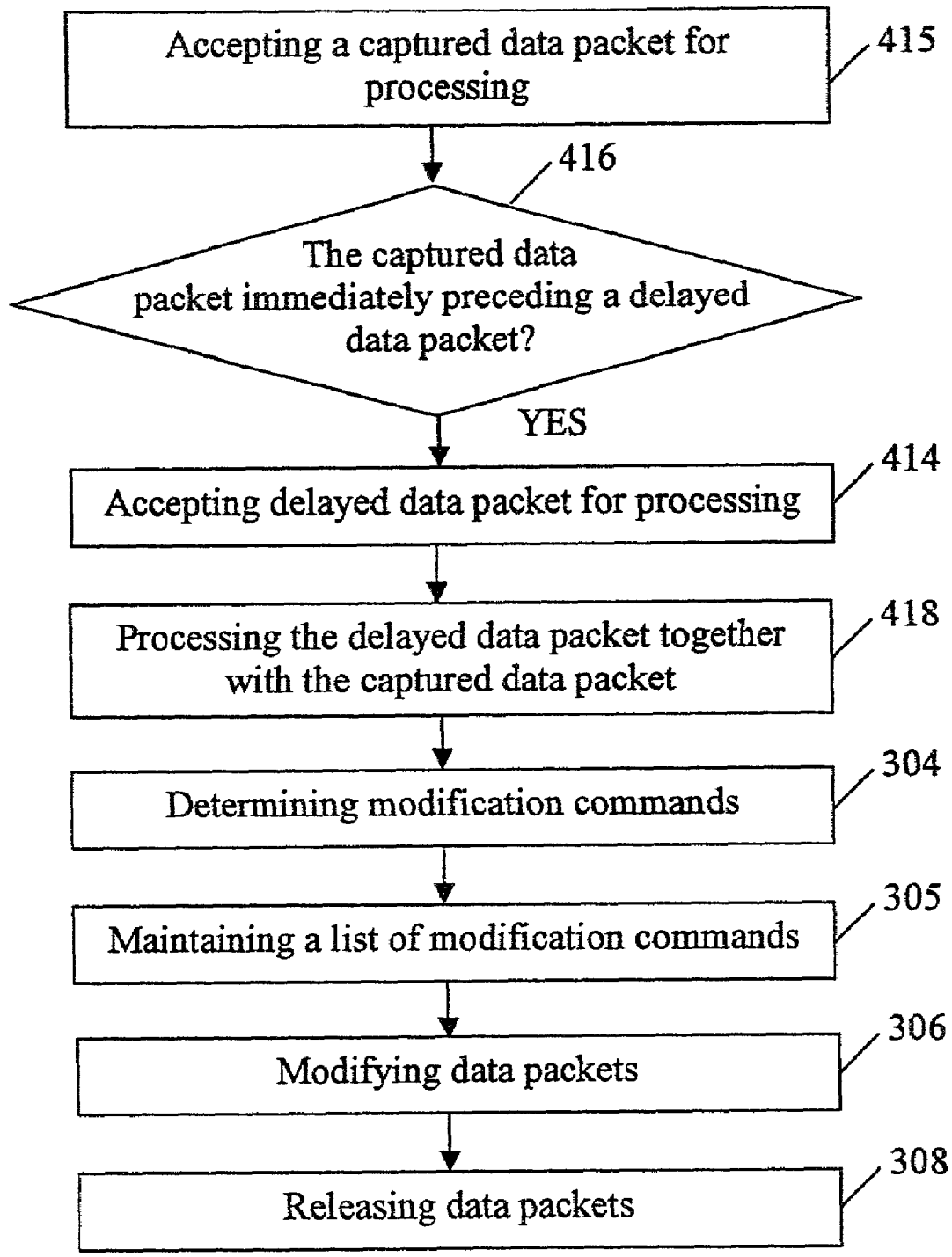

FIG. 5B illustrates as an example flowchart of another method for accepting a delayed data packet for processing. The method is applicable for handling data packets containing information fragments belonging to a sequence of information fragments or for handling data packets belonging to a set of data packets having at least partly hierarchical structure. In step 415 a captured data packet is accepted for processing. In step 416 said captured data packet and a first delayed data packet are compared. The term first delayed data packet does not necessarily refer to the first delayed data packet, but in general to some delayed data packet. Of course, the first data packet may be the first delayed data packet, but it may also be some other delayed data packet. Typically the comparison is done implicitly, on the basis of knowledge about the delayed data packets. The comparison may be done also explicitly by comparing the actual data packets. If it is detected, that the captured data packet contains the information fragment immediately preceding the information fragments of said first delayed data packet in said sequence of information fragments or that the captured data packet precedes said first delayed data packet in said at least partly hierarchical structure, the first delayed data packet is accepted for processing in step 414. Again it is possible to accept several delayed data packets at the same time, if the structure of the set of data packets allows it.

The contents of the captured data packet is then processed together with the contents of the first delayed data packet in step 418. In step 304, modification command(s) is(are) determined, and a list of modification commands is maintained in step 305. The first delayed and the captured data packets are modified according to the list of modification commands in step 306 and the modified first delayed and the modified captured data packets are released in step 308.

Figure 5C:
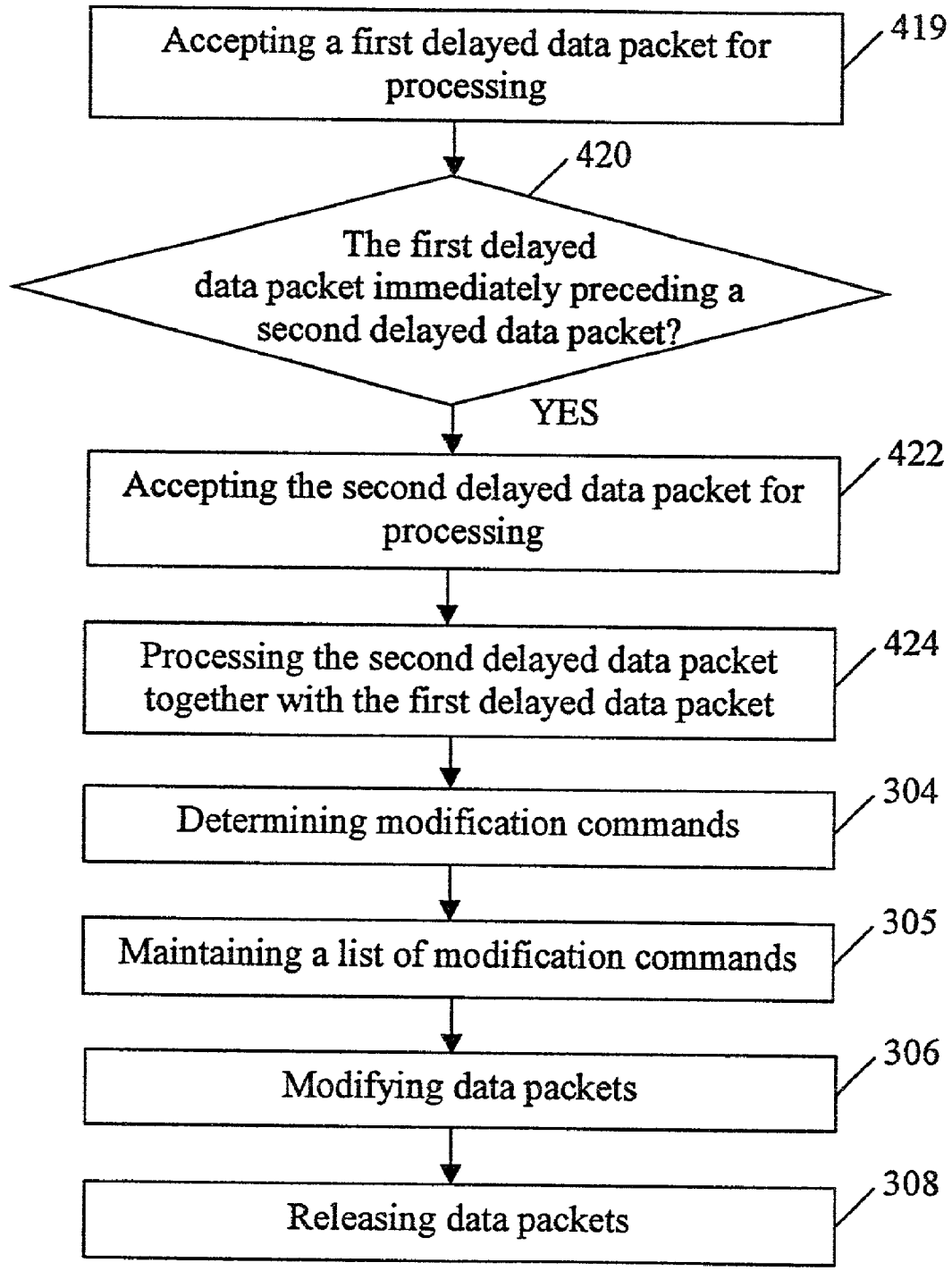

FIG. 5C illustrates as an example a flowchart of a still other method for accepting a delayed data packet for processing. The method is applicable for handling data packets containing information fragments belong to a sequence of information fragments or for handling data packets belonging to a set of data packets having at least partly hierarchical structure. In step 419, a first delayed data packet is accepted for processing. This may refer for example to the first delayed data packet, which was accepted for processing in the flowchart of FIG. 5B. In step 420, said first delayed data packet and a second delayed data packet are compared. The terms first and second delayed data packet refer in general to some delayed data packets. The comparison may be done either implicitly or explicitly. If it is detected, that the first delayed data packet contains the information fragment immediately preceding the information fragments of said second delayed data packet in said sequence of information fragments or that the first delayed data packet precedes said second delayed data packet in said at least partly hierarchical structure, the second delayed data packet is accepted for processing in step 422. Also in this case it is possible to accept several delayed data packets at the same time, if the structure of the set of data packets allows it.

The contents of the first delayed data packet is then processed together with the contents of the second delayed data packet in step 424. In step 304, modification command(s) is(are) determined, and a list of modification commands is maintained in step 305. The first delayed and the second delayed data packets are modified according to the list of modification commands in step 306 and the modified first delayed and the modified second delayed data packets are released in step 308. It is possible to iterate the process of accepting delayed data packets for processing as long as there are delayed data packets, and to process all accepted data packets together only after all subsequent delayed data packets have been accepted for processing. In general, a captured data packet may be processed together with all delayed data packets that can be accepted for processing on the basis of the captured data packet or on the basis of some delayed data packet which is accepted for processing.

Figure 5D:
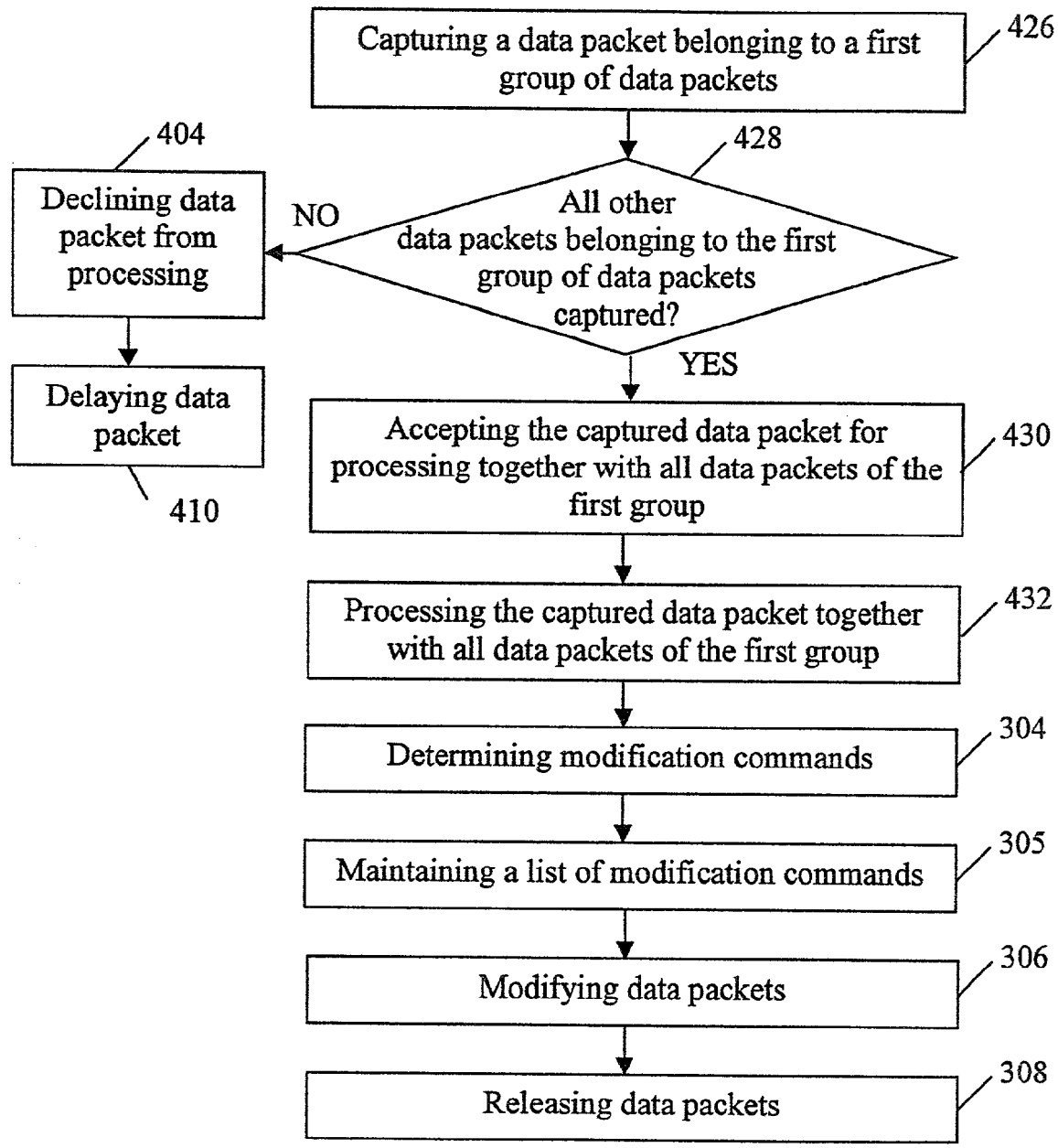

FIG. 5D illustrates as an example a flowchart of a method for accepting or declining captured data packets, which form a plurality of groups of data packets. Advantageously, captured data packets are accepted for processing in groups. In step 426 a data packet belonging to a first group of data packets is captured. In step 428 said captured data packet and data packets captured prior to said captured data packet are compared. The data packets captured prior to said captured data packet refer to delayed data packets. The comparison of data packets may be done either implicitly or explicitly. If it is detected, that all other data packets belonging to the first group of data packets except for the captured data packet are not yet captured (delayed), the captured data packet is declined from processing in step 404. In step 410, the declined data packet is delayed.

If it is detected in step 428, that all other data packets belonging to the first group of data packets except for the captured data packet are already captured (delayed), the captured data packet and delayed data packets of the first group of data packets are accepted for processing in step 430. The contents of the captured data packet is then processed together with the contents of all other data packets of the first group of data packets in step 432. In step 304, modification command(s) is(are) determined, and a list of modification commands is maintained in step 305. The captured and the delayed data packets of the first group of data packets are modified according to the list of modification commands in step 306 and the modified captured and the modified delayed data packets are released in step 308.

Above described method of handling plurality of groups of data packets may be further combined to any other presented method. For example said plurality of groups of data packets may further belong to a sequence of groups of data packets, and said groups of captured data packets may be processed in the order specified by said sequence. Alternatively, the groups of data packets may belong to some other at least partly hierarchically structured set of groups.

Figure 6A:
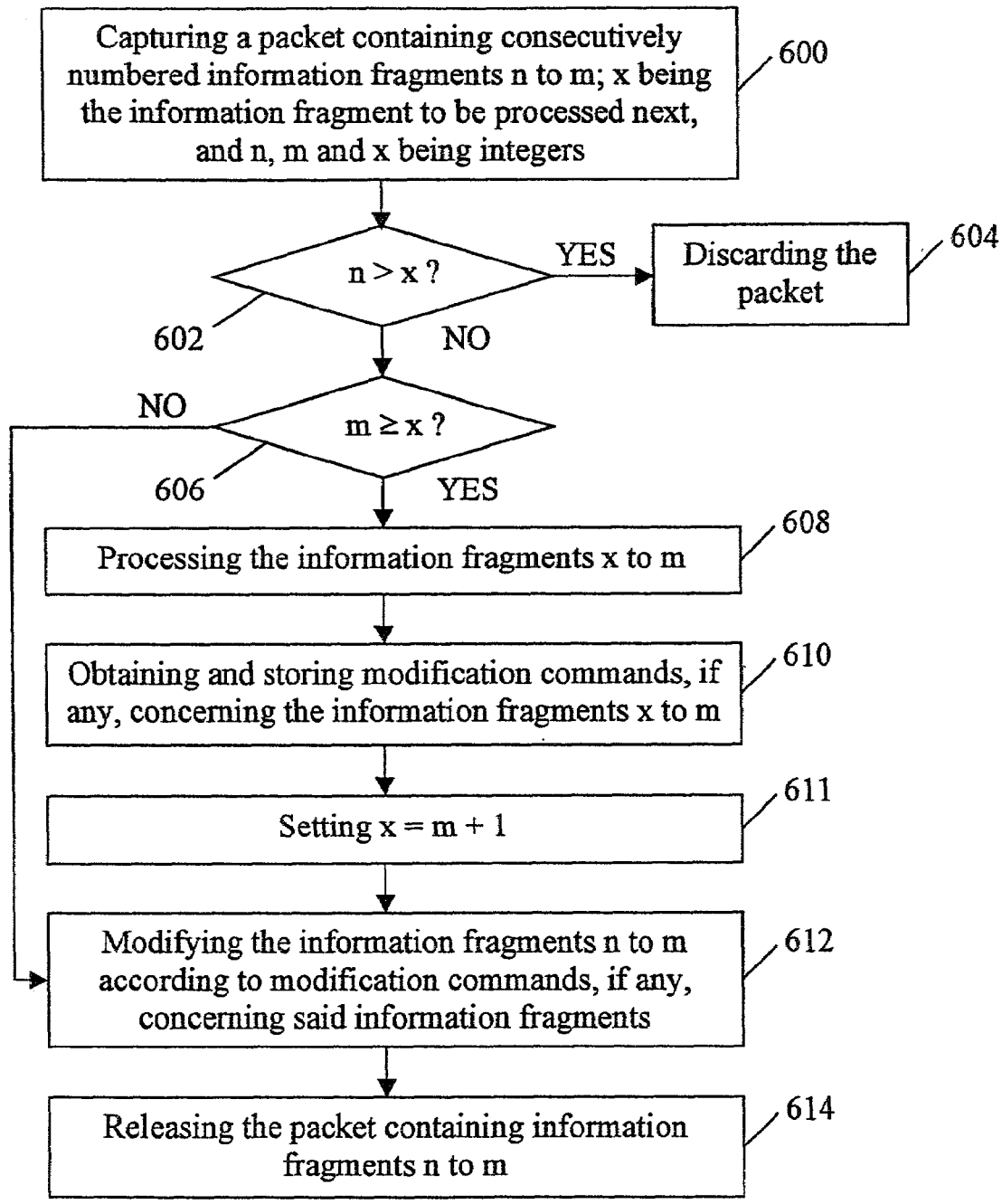
FIGS. 6A, 6B and 6C illustrate as examples flowcharts of methods according to the invention in connection with handling especially TCP data packets.
Figure 6B:
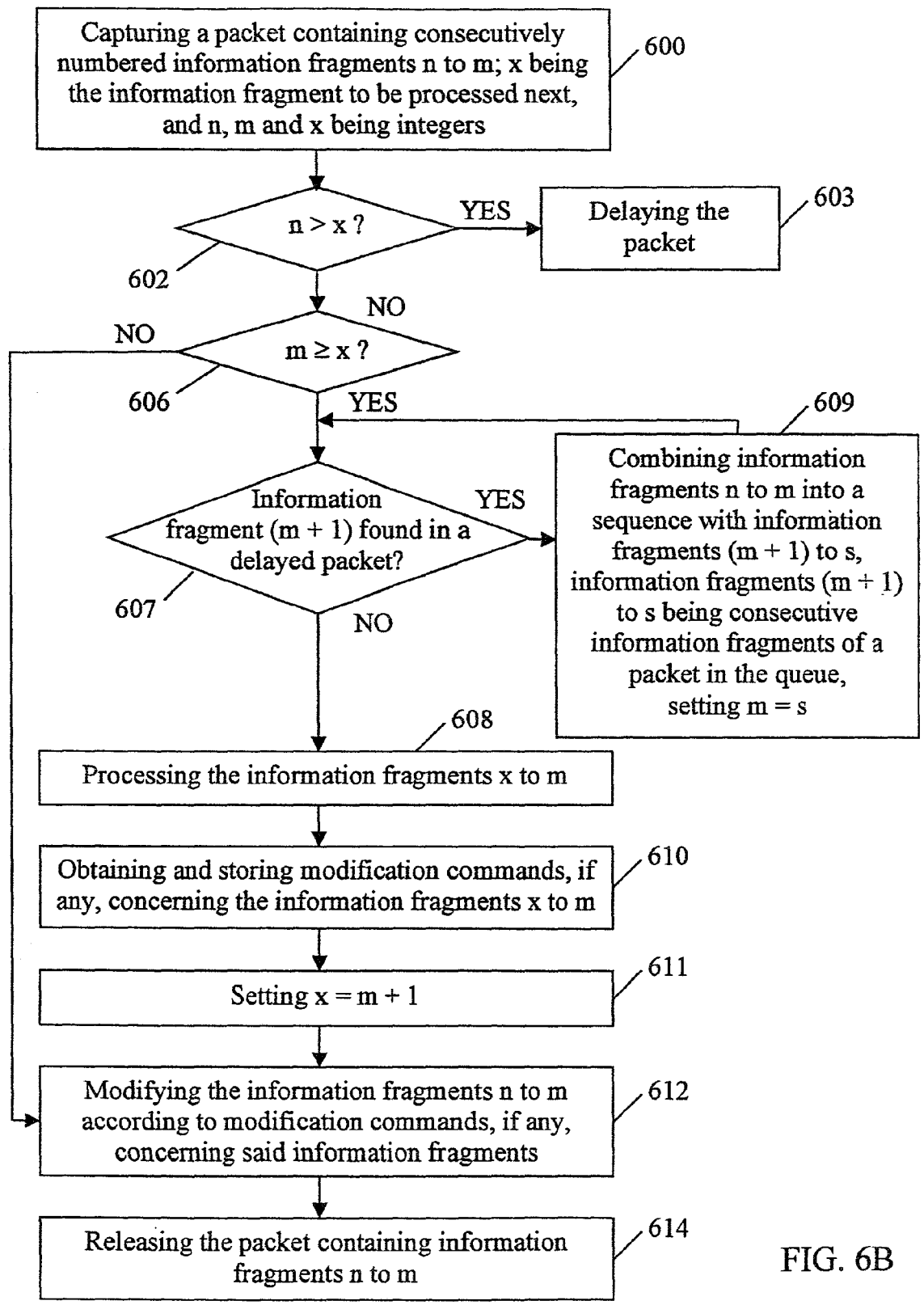
Figure 6C:
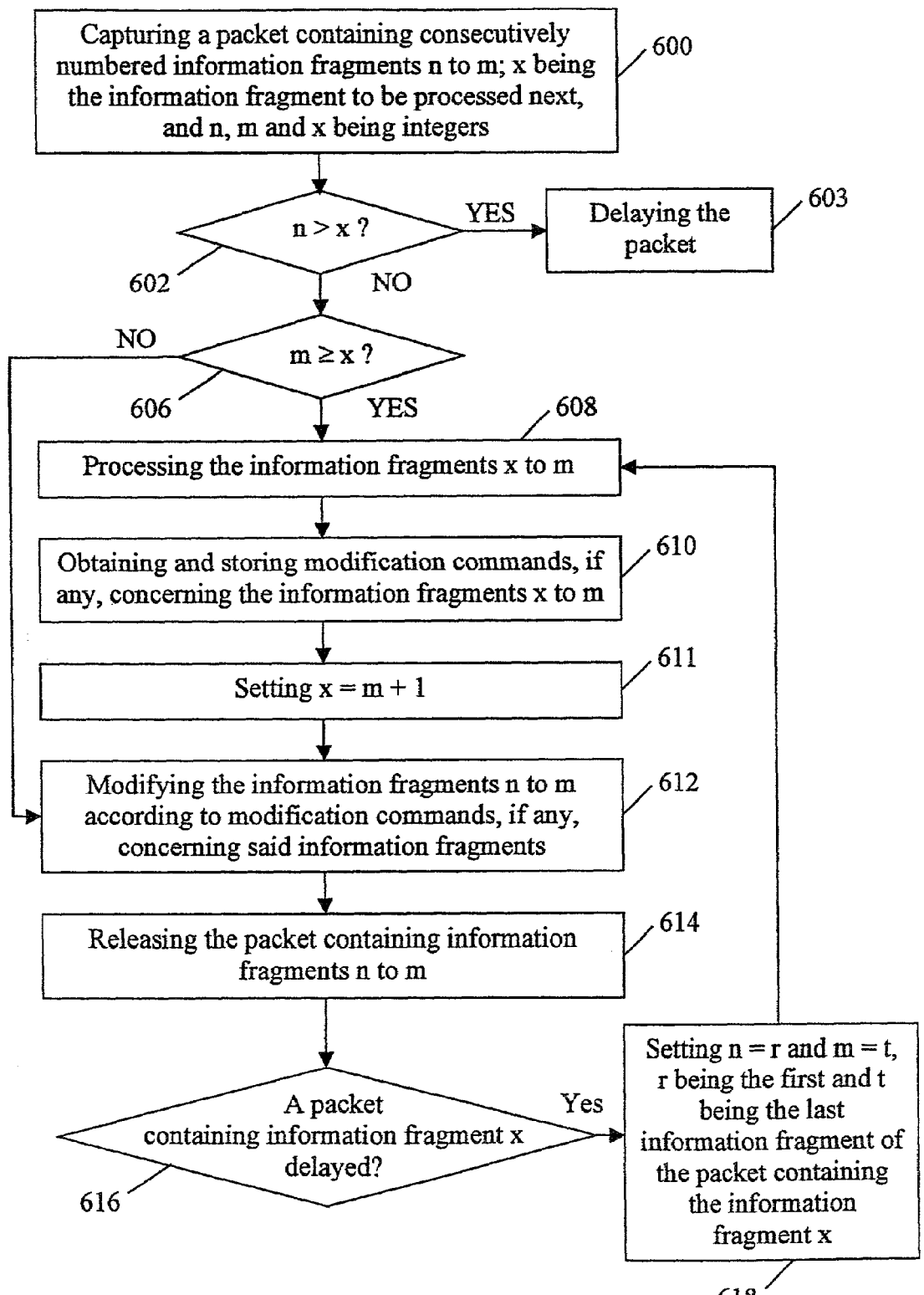

FIGS. 6A, 6B and 6C illustrate as examples flowcharts of methods according to the invention in connection with handling especially TCP data packets. As was stated before, according to the TCP protocol, information fragments (octets of data) are numbered sequentially. The information fragments are processed in the order specified by the sequence numbers in order to reliably interpret the information. Additionally, each information fragment is processed only once.

FIG. 6A illustrates as an example a flowchart of a method, where captured data packet is discarded, if the information fragments immediately preceding the information fragments of the captured data packet are not yet processed.

In step 600, a data packet containing information fragments n to m is captured. The lowest sequence number within the captured data packet is n and the highest sequence number is m. At the moment of capturing said data packet the sequence number of the information fragment to be processed next is x. The variables n, m and x are integers.

In steps 602 and 606, x, n and m are compared in order to determine whether the information fragments immediately preceding the information fragments of the captured data packet are already processed or not. If n>x, i.e. the lowest sequence number in the captured data packet is higher than the sequence number of the information fragment to be processed next, the data packet captured in step 600 is declined from processing and discarded in step 604. Then the same procedure is repeated for the next data packet. Otherwise, if m>x, i.e. the highest sequence number in the captured data packet is lower than the sequence number of the information fragment to be processed next, which indicates that information fragments of the captured data packet are already processed, the captured data packet is declined from processing as well, but the data packet is not discarded.

If m≧x, i.e. the highest sequence number in the captured data packet is higher than the sequence number of the information fragment to be processed next, which indicates that at least some information fragments of the captured data packet are not yet processed, the information fragments x to m are processed in step 608. This means that only the information fragments of the captured data packet that are not yet processed are processed. In step 610 modification commands concerning the information fragments x to m are obtained and stored, if such modification commands exist. Naturally, not all the information fragments need to be modified. In step 611 x=m+1 is set. That is x is updated to the correct value indicating the sequence number of the information fragment to be processed next.

In step 612, the information fragments n to m of the captured data packet are modified according to modification commands concerning said information fragments n to m, if such modification commands exist. This means that all information fragments of the captured data packet are modified. Also the information fragments of a captured data packet, where m<x and which was declined from processing in step 606, are modified. The modified captured data packet containing modified information fragments n to m is then released in step 614.

FIG. 6B illustrates as an example a flowchart of a method, where captured data packet is delayed, if the information fragments immediately preceding the information fragments of the captured data packet are not yet processed. The information fragments of a captured data packet may be combined with information fragments of delayed data packet(s) for processing.

In step 600, a data packet containing information fragments n to m is captured. The lowest sequence number within the captured data packet is n and the highest sequence number is m. At the moment of capturing said data packet the sequence number of the information fragment to be processed next is x. The variables n, m and x are integers.

In steps 602 and 606, x, n and m are compared in order to determine whether the information fragments immediately preceding the information fragments of the captured data packet are already processed or not. If n>x, i.e. the lowest sequence number in the captured data packet is higher than the sequence number of the information fragment to be processed next, the data packet captured in step 600 is declined from processing and delayed in step 603. Then the same procedure is repeated for the next data packet. Otherwise, if m<x, i.e. the highest sequence number in the captured data packet is lower than the sequence number of the information fragment to be processed next, which indicates that information fragments of the captured data packet are already processed, the captured data packet is declined from processing as well, but the data packet is not delayed.

If m≧x, i.e. the highest sequence number in the captured data packet is higher than the sequence number of the information fragment to be processed next, which indicates that at least some information fragments of the captured data packet are not yet processed, the sequence numbers of the information fragments of the captured data packet are compared to the sequence numbers of the information fragments of the delayed data packets in step 607.

Information fragments x to m are then processed in step 608. This means that only the information fragments of the captured data packet (and delayed data packets) that are not yet processed are processed. In step 610 modification commands concerning the information fragments x to m are obtained and stored, if such modification commands exist. Naturally, not all the information fragments need to be modified. In step 611 x=m+1 is set. That is x is updated to the correct value indicating the sequence number of the information fragment to be processed next.

In step 612, the information fragments n to m of the captured data packet are modified according to modification commands concerning said information fragments n to m, if such modification commands exist. This means that all information fragments of the captured data packet are modified. Also the information fragments of a captured data packet, where m<x and which was declined from processing in step 606, are modified. The modified captured data packet and modified delayed data packet(s) containing modified information fragments n to m are then released in step 614.

FIG. 6C illustrates as an example a flowchart of a method, where captured data packet is delayed, if the information fragments immediately preceding the information fragments of the captured data packet are not yet processed. After releasing a modified captured data packet it is checked, if the information fragment to be processed next is found in one of the delayed packet.

In step 600, a data packet containing information fragments n to m is captured. The lowest sequence number within the captured data packet is n and the highest sequence number is m. At the moment of capturing said data packet the sequence number of the information fragment to be processed next is x. The variables n, m and x are integers.

In steps 602 and 606, x, n and m are compared in order to determine whether the information fragments immediately preceding the information fragments of the captured data packet are already processed or not. If n>x, i.e. the lowest sequence number in the captured data packet is higher than the sequence number of the information fragment to be processed next, the data packet captured in step 600 is declined from processing and delayed in step 603. Then the same procedure is repeated for the next data packet. Otherwise, if m<x, i.e. the highest sequence number in the captured data packet is lower than the sequence number of the information fragment to be processed next, which indicates that information fragments of the captured data packet are already processed, the captured data packet is declined from processing as well, but the data packet is not delayed.

If m≧x, i.e. the highest sequence number in the captured data packet is higher than the sequence number of the information fragment to be processed next, which indicates that at least some information fragments of the captured data packet are not yet processed, the information fragments x to m are processed in step 608. This means that only the information fragments of a data packet that are not yet processed are processed. In step 610 modification commands concerning the information fragments x to m are obtained and stored, if such modification commands exist. Naturally, not all the information fragments need to be modified. In step 611 x=m+1 is set. That is x is updated to the correct value indicating the sequence number of the information fragment to be processed next.

In step 612, the information fragments n to m of the captured data packet are modified according to modification commands concerning said information fragments n to m, if such modification commands exist. This means that all information fragments of the captured data packet are modified. Also the information fragments of a captured data packet, where m<x and which was declined from processing in step 606, are modified. The modified captured data packet containing modified information fragments n to m is then released in step 614.

In FIGS. 4, 5 and 6 discussed above, processing of captured data packets involves determining of modification commands according to which captured data packets are then modified. Nevertheless, the method of handling data packets according to the invention is applicable also without determining modification commands. It may be for example desired to monitor communication traffic traversing some network element. In that case the processing step does not involve determining modification commands, and data packets are not modified. Typically, processing comprises recording and/or analysing the contents of data packets, and after processing the data packets are released. If a data packet which is already processed is captured, the data packet is released right away without processing or modifying. Otherwise handling of data packets is done in the same way as described in connection with FIGS. 4, 5 and 6.

Figure 7:
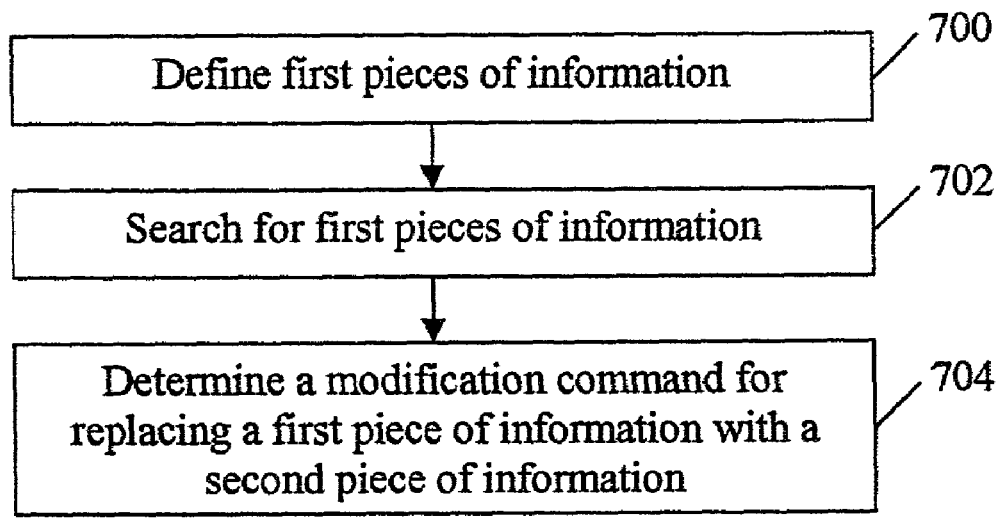
FIG. 7 illustrates as an example a method of modifying data packets.

FIG. 7 illustrates as an example a method of modifying data packets. In step 700, a plurality of first pieces of information, which are to be replaced in data packets with a plurality of corresponding second pieces of information, are defined. When the contents of data packets are processed, said first pieces of information are searched for in step 702. If a first piece of information is found in the contents of a data packet, at least one modification command specifying at least the replacement of said first piece of information with a corresponding second piece of information is determined in step 704. If the length of said first piece of information is different from the length of said corresponding second piece of information and if said first piece of information is found in payload of data packet(s), said modification command comprises instructions for changing value of at least one header field in a data packet. In TCP, the header field that needs to be modified is typically the field indicating the sequence number of the payload of the data packet or the sequence number of acknowledged data. Advantageously, instructions for modifying a header field are obtained indirectly from the modification commands concerning the replacement of the first piece of information with the second piece of information.

A modification command needs to include enough information for performing modification of a present captured data packet and future captured data packets. It is possible to include in a modification command for example: a first identifier indicating the beginning of the first piece of information in the original contents of the captured data packets (org_sequence), a second identifier indicating the beginning of the second piece of information in the modified contents of the captured data packets (new_sequence), an offset between a third identifier indicating the end of the first piece of information in the original contents of the captured data packets and a fourth identifier indicating the end of the second piece of information in the modified contents of the captured data packets (offset), the length of the first piece of information (org_length), the length of the second piece of information (new_length), and the second piece of information (new_data). Nevertheless, a modification command is not restricted to the presented structure; all this information may not be required and also other information may be included in a modification command. The identifier indicating the beginning or the end of a piece of information may be for example a sequence number of an octet.

The example illustrated in FIG. 7 presented a simple find-replace algorithm for performing modifications. Also more intelligent methods may be employed. For example, the beginning part of the first piece of information may be searched for. If said beginning part is found in a first data packet, it is known that there may be something that needs to be modified, even though the whole first piece of information was not found. In this case the beginning part of the first piece of information is stored and said beginning part is cleared in the first data packet before releasing the first data packet. Then it is checked, if the rest of the first piece of information is found in a second data packet following the first data packet. If that is the case, the rest of the first piece of information is replaced by the second piece of information in the second data packet. If the rest of the first piece of information is not found in the second data packet (indicating that said first piece of information is not there and the modification is not required), the beginning part of the first piece of information is inserted in the beginning of the second data packet.

Consider following example: information fragments "PORT 40, 4, 4, 5, 4, 123" relating to well known FTP (File Transfer Protocol) need to be replaced by "PORT 10, 10, 11, 1, 1, 12" and "PORT 40, 1, 1, 1, 3, 3" does not require any modifications. If "PORT 40, 4, 4, 5, 4, 123" is divided into two data packets so that "PORT 40, " is included in a first data packet and "4, 4, 5, 4, 123" in a second data packet, it cannot be known on the basis of the first data packet, whether "PORT 40, "needs to be modified or not. In this case "PORT 40, " is stored and "PORT 40," is replaced by "" in the first data packet before releasing the first data packet. It is possible to leave "PORT_" within the first data packet since that part of the information does not need to be modified. Then the second data packet is processed and "4, 4, 5, 4, 123" is found. Now it is known that "PORT 40,"needs to be replaced by "PORT 10, "and "4, 4, 5, 4, 123" needs to be replaced by "10, 11, 1, 1, 12". "4, 4, 5, 4, 123" in the second data packet is replaced by "PORT 10, 10, 11, 1, 1, 12" before releasing the second data packet. If "1, 1, 1, 3, 3" would have been found in the second data packet "PORT 40, " would have been inserted into the beginning of the second data packet before releasing the second data packet.

In the following is presented a simplified example of how a method according to the invention works in conjunction with TCP, when an original data stream "Hello world" from a sending end traverses a security gateway, and the original data stream is modified to a new data stream "Hi there" for the receiving end. The modification is based on a rule that any data stream received from the sending end is modified to data stream "Hi there". The example is hypothetical, but for example in conjunction with opening an SMTP (Simple Mail Transfer Protocol) connection a similar modification may be desired. The method illustrated in FIG. 6C is employed. The original data stream is sent in several packets and the packets arrive at the security gateway in arbitrary order. The packets are acknowledged by the receiving end. The original data stream is modified to the new data stream packet-by-packet and the sequence numbers are modified accordingly. Also sequence numbers of acknowledgements are modified accordingly.

In normal communications the data streams that need to be modified are typically fully included in one data packet. Nevertheless, it is possible that such data stream is split into more than one data packet. In reality also the data stream "Hello world" would be within one data packet, but splitting the data stream into several packets in this example serves the aspect of illustrating how the method according to the invention operates in a situation, where a data stream to be modified is split into two or more packets. Especially some malicious network attacks are based on the possibility of splitting a data stream into more than one data packet, and therefore it is important to be able to interpret also such data stream reliably.

Following notation is used in the example:

Data stream or data packet: (first sequence number, "data"), and

Modification command: <org_sequence, org_length, "new_data">.

The structure of the modification command indicates that, when a first piece of information in a captured data packet is replaced with a second piece of information, the resulting modification command includes: a first identifier (sequence number) indicating the beginning of the first piece of information in the original contents of the captured data packets (oriqseq), the length of the first piece of information (org_length), and the second piece of information (new_ data).

This information is enough for determining the modifications required in the present and future data packets.

The sending end sends packets (1, "Hel") and (4, "lo_").

The next sequence number that has not been processed is 1. The value of the first sequence number is identified when a connection is initiated.

Packet (4, "lo_") is captured. 4>1=> data cannot be processed yet. The packet (4, "lo_") is delayed.

Packet (1, "Hel") is captured. 1≦1=> data can be processed. The packet (1, "Hel") is processed, and a modification command <2, 2, "i"> is obtained. Data is modified accordingly and a packet (1, "Hi") is released. The next sequence number that has not been processed is 1+length("Hel")=4.

After this, the delayed packets are checked, and the delayed packet (4, "lo_") is found. 4<4=> data can be processed. The packet (4, "lo_") is processed, and a modification command <4, 2, ""> is obtained. Data is modified accordingly and a packet (4, "_") is obtained. At the sequence number 4, the sequence number offset between the original and modified data stream is 2−length("i")=1. The sequence number of the packet (4, "_") is modified accordingly and a packet (3, "_") is released. The next sequence number that has not been processed is 4+length("lo_")=7.

The receiving end receives the packet (1, "Hi"), and acknowledges that the next sequence number it has not received is 1+length("Hi")=3.

The acknowledgement for the sequence number 3 is captured. Prior to the sequence number 3, a modification command <2, 2, "i"> is found. The resulting sequence number offset between the original and modified data stream is 2−length("i")=1. Thus, an acknowledgement for the sequence number 3+1=4 is released.

The receiving end receives the packet (3, "_") and acknowledges that the next sequence number it has not received is 3+length("_")=4.

The acknowledgement for the sequence number 4 is captured. Prior to the sequence number 4, modification commands <2, 2, "i"> and <4, 2, ""> are found. The resulting sequence number offset between the original and modified data stream is on the basis of previous modification commands 2−length("i")+2−length("")=2−1+2−0=3. Thus, an acknowledgement for the sequence number 4+3=7 is released.

The sending end receives the acknowledgement for the sequence number 4 and sends packets (4, "lo_wor") and (10, "ld").

Packet (10, "ld") is captured. 10 >7=>data cannot be processed yet. The packet (10, "ld") is delayed.

Packet (4, "lo_wor") is captured. 4≦7=> data can be processed. Data stream (7, "wor") is processed, and a modification command <7, 3, "the"> is obtained. The "lo_" portion of the data stream of the packet (4, "lo_wor") has already been processed, so it does not need to be processed any more. The packet (4, "lo_wor") is modified according to the modification command <7, 3, "the"> and previously obtained modification command <4, 2, "">. At this point a packet (4, "_the") is obtained. At the sequence number 4, the sequence number offset between the original and modified data stream is 2−length("i")=1. The sequence number of the packet (4, "_the") is modified accordingly and a packet (3, "_the") is released. The next sequence number that has not been processed is 7+length("wor")=10.

After this, the delayed packets are checked, and the delayed packet (10, "ld") is found. 10<10=> data can be processed. The packet (10, "ld") is processed, and a modification command <10, 2, "re"> is obtained. Data is modified accordingly and a packet (10, "re") is obtained. At the sequence number 10, the sequence number offset between the original and modified data stream is on the basis of previous modification commands 2−length("i")+2−length("")+3−length("the")=2−1+2−0+3−3=3. The sequence number of the packet (10, "re") is modified accordingly and a packet (7, "re") is released. The next sequence number that has not been processed is 10+length("ld")=12.

The receiving end receives the packet (3, "_the"), and acknowledges that the next sequence number it has not received is 3+length("_the")=7.

The acknowledgement for the sequence number 7 is captured. Prior to the sequence number 7, modification commands <2, 2, "i"> and <4, 2, ""> are found. The resulting sequence number offset between the original and modified data stream on the basis of previous modification commands 2−length("i")+2−length("")=2−1+2−0=3. Thus, an acknowledgement for the sequence number 7+3=10 is released.

The receiving end receives the packet (7, "re"), and acknowledges that the next sequence number it has not received is 7+length("re")=9.

The acknowledgement for the sequence number 9 is captured. Prior to the sequence number 9, modification commands <2, 2, "i"> and <4, 2, ""> are found. The resulting sequence number offset between the original and modified data stream on the basis of previous modification commands 2−length("i")+2−length("")=2−1+2−0=3. Thus, an acknowledgement for the sequence number 9+3=12 is released.

The sending end receives the acknowledgements for the sequence numbers 9 and 12.

In the above described example the packets (1, "Hel") and (4, "lo_") arrived at the security gateway in wrong order and the packet and (4, "lo_") that could not be processed at the moment of arrival was delayed. Another possibility to handle the situation would have been to simply discard the packet (4, "lo_") and let the resending functionality of TCP to take care of the situation. Since the acknowledgement for the packet (4, "lo_") was not received at the sending end before a timeout occurred the data of the packet (4, "lo_") was resent in the packet (4, "lo_wor"). This way, the security gateway would have been able to continue handling the data packets even though the packet (4, "lo_") would not have been processed at all. Nevertheless, if there is memory space available, packets can be delayed. This way, the delay caused by activating the resending procedure at the sending end is avoided and TCP/IP congestion avoidance behaviour is not necessarily triggered.

Another thing that requires memory space is the modification commands. The modification commands can be erased only after they are not needed any more, that is the data they concern does not traverse the security gateway any more. The knowledge obtained from the position of a sliding window that is used for controlling the TCP packet flow, can be used for determining which modification commands can be erased. The window starts from some sequence number and ends to some sequence number. The first octet inside the window has been sent or is being sent by the sending end, but an acknowledgement for the octet has not been received. The octets with a sequence number lower than the sequence number of the first octet inside the window have been sent and acknowledged and therefore will not be resent anymore. The octets inside the window may be resent. Thus, on the basis of the starting point of the window it is known which modification commands can be erased, that is the modification commands concerning sequence numbers, that are lower than the sequence number of the first octet inside the window, can be erased.

To simplify the bookkeeping in the security gateway, it is also possible to erase the modification commands that are not likely to be needed anymore. For example, a modification command may be erased after some predetermined time after the command was first obtained or after some predetermined amount of modification commands has accumulated. If, however, a packet (1, "Hel") of the previous example is captured, the next sequence number that has not been processed is 12 and the modification command <2, 2, "i"> has already been erased, the packet (1,"Hel") is typically discarded, since it is likely that the receiving end has already received the data of the packet (1, "Hel").

In the above described example a modification command included org_sequence, org_length and new_data, which is enough for determining the modifications required in the present and future data packets. Nevertheless, as was stated before also more information may be included in the modification commands. In order to perform the modifications rapidly, it may be advantageous to include more information in the modification commands. If the modification commands of the above described example would include new_sequence, offset and new_length in addition to org_sequence, org_length and new_data, the modification command<2, 2, "i"> would be:

org_sequence:2
new_sequence: org_sequence+previous offset=2+0=2
offset: previous offset+(new_length−org_length)=0+(1−2) =−1
org_length:2
new_length: length("i")=1
new_data: "i"

Similarly the modification command <4, 2, ""> would be:
oriqseq: 4
new_sequence: org_sequence+previous offset=4+(−1)=3
offset: previous offset+(new_lengthnew_length−org_length) =−1+(0−2)=−3
org_length:2
new_lengthnew_length:0
new_data:"".

The method according to the invention is also suitable for network element clusters. It is an aspect of the invention to present a method of transferring handling of sets of data packets from one node of a cluster to another node of a cluster. Typically a set of data packets requiring transferring between nodes is a communication connection traversing a security gateway cluster. The idea of the invention is to transfer the state of the specific code portion processing the contents of the data packets of a connection with the information about the connection. The state of the specific code portion comprises the modification command affecting at least one of the data packets of the connection.

Figure 8:
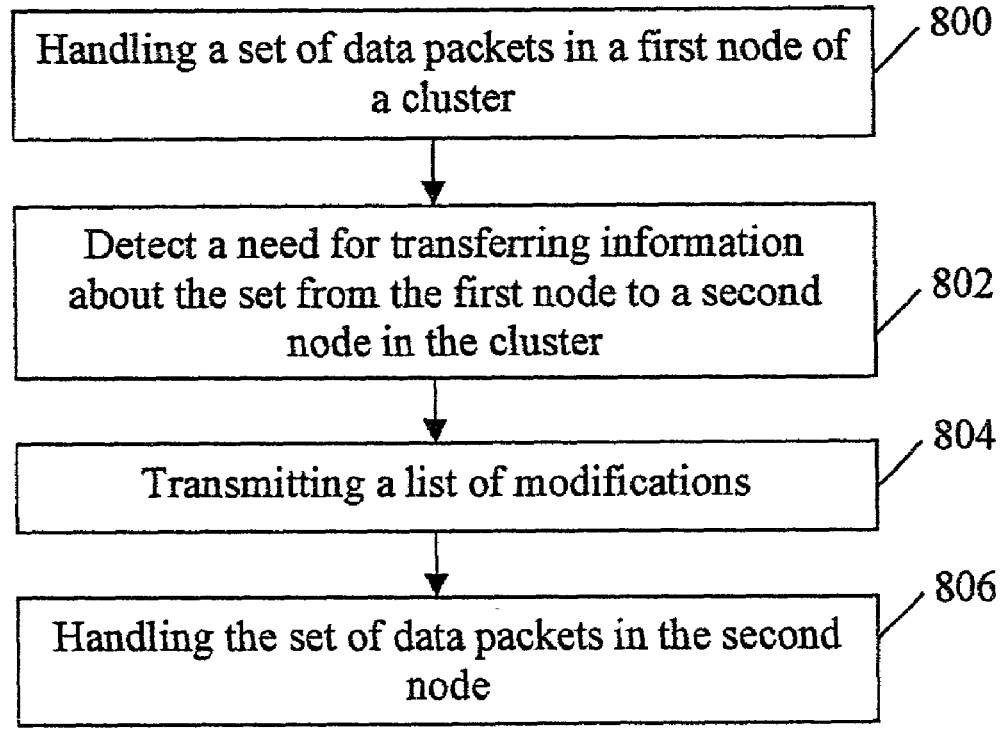
FIG. 8 illustrates as an example a method of transferring handling of a set of data packets from a first node of a network element cluster to a second node of the network element cluster.

FIG. 8 illustrates as an example a method of transferring handling of a set of data packets from a first node of a network element cluster to a second node of the network element cluster. In step 800, the set of data packets is handled in the first node of the network element cluster. A need for transferring information about the set of data packets from the first node to the second node is detected in step 802 and a list of modification commands is transmitted from the first node to the second node in step 804. In step 806, the set of data packets is handled in the second node of the network element cluster. In other words, the state of the process handling the set of data packets is transferred from the first node to the second node in order to enable to continue handling the set of data packets in the second node.

When handling said set of data packet is begun in the first node, an entry representing said set of data packets is stored in the first node in a connection data structure. Such entry is stored for example when a first data packet of a communication connection is handled in a security gateway and the connection is allowed to traverse the security gateway. Before the set of data packets is handled in the second node, the entry corresponding to that particular set of data packets is transmitted from the first node to the second node. This entry is the state of the set of data packets.

Figure 9A:
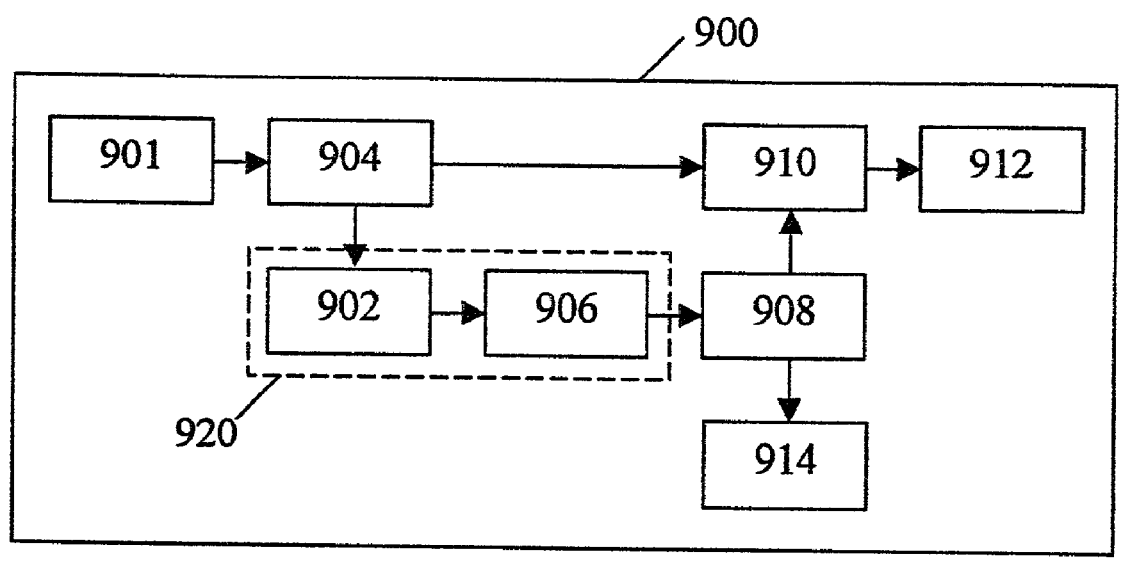
FIG. 9A illustrates as an example a software entity according to the invention.

FIG. 9A illustrates as an example a software entity 900 according to the invention. The software entity handles data packets belonging to a set of data packets. The software entity comprises program code means 901 for capturing data packets, which may arrive in an arbitrary order, program code means 904 for accepting a captured data packet for processing or declining a captured data packet from processing based on said captured data packet and data packets captured prior to said captured data packet and program code means 902 for processing a captured data packet.

The software entity may further comprise program code means 906 for determining a modification command affecting at least one data packet, as a response to processing at least one captured data packet, and program code means 908 for maintaining a list of modification commands, said list enabling modification of captured data packets, program code means 910 for modifying captured data packets based on said list of modification commands, and program code means 912 for releasing modified captured data packets. The software entity may still further comprise program code means 914 for transmitting said list of modification commands, if the software entity is a part of a node of a network element cluster and it is required that data packets belonging to the same set can be handled in more than one node of the cluster.

It is advantageous to have program code means 902 for processing the contents of a captured data packet as a separate code portion in contrast to the program code means 904 for accepting or declining a data packet and program code means 910 for modifying the contents of captured data packets. In this way for processing there is no need for any knowledge in the program code means 902 about the order of data packets or whether some data packets are already processed. Therefore the structure of the program code means 902 may be simple and implementing such means for different purposes is easy. Advantageously, program code means 902 and program code means 906 are combined into a software entity 920, which may be separate from the software entity 900. The software entity 920 is adapted to receive data, and to output a modification command indicating a modification to be made to the data stream. Typically program code means 906 for determining modification commands are implemented in the same code portion with the program code means 902 for processing, and usually program code means 902 and 906 form a specific code portion described earlier in this document.

Figure 9B:
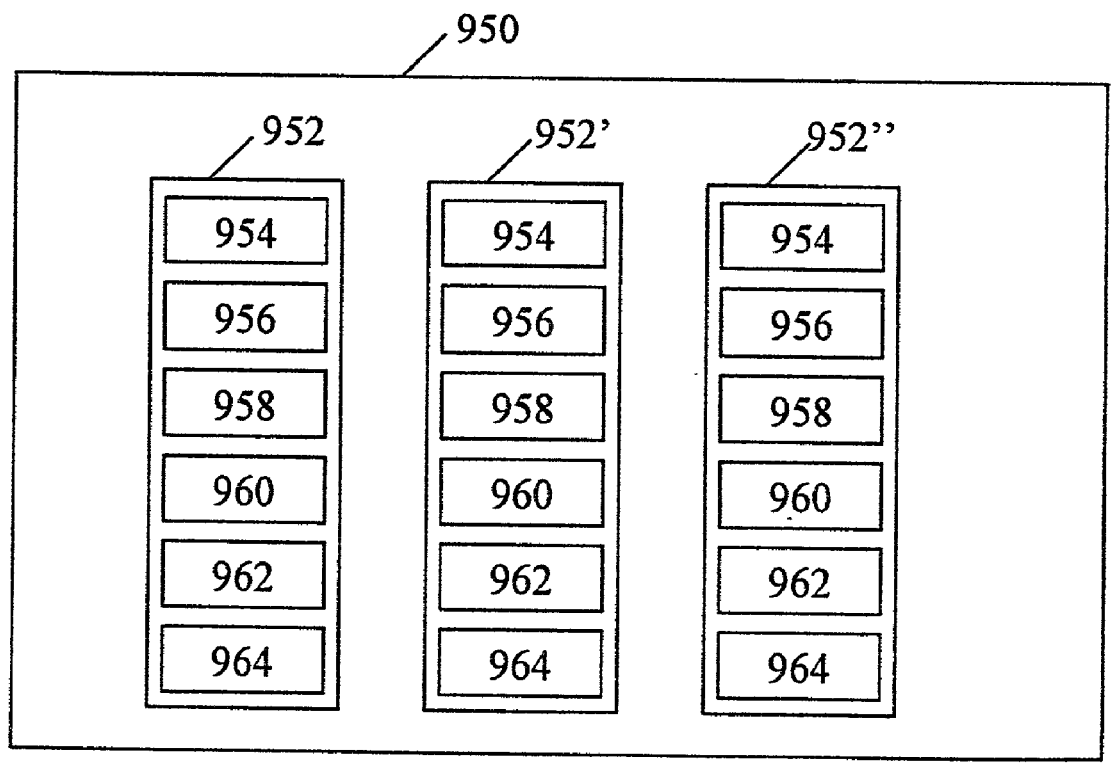
FIG. 9B illustrates as examples a network element node and a network element cluster according to the invention.

FIG. 9B illustrates as examples a network element node 952 and a network element cluster 950 according to the invention. The network element node 952 comprises means 954 for capturing data packets, which may arrive in an arbitrary order, means 958 for accepting a captured data packet for processing or declining a captured data packet from processing based on said captured data packet and data packets captured prior to said captured data packet and means 956 for processing a captured data packet. The node 952 may further comprise means 960 for determining a modification command affecting at least one data packet, as a response to processing at least one captured data packet, means 962 for maintaining a list of modification commands, said list enabling modification of captured data packets, and means 964 for transmitting said list of modification commands from said node to another node of said cluster of network elements.

The network element cluster may comprise several network element nodes 952. Typically all nodes of a cluster comprise similar means, but the nodes may be also different from each other.

Figure 10:
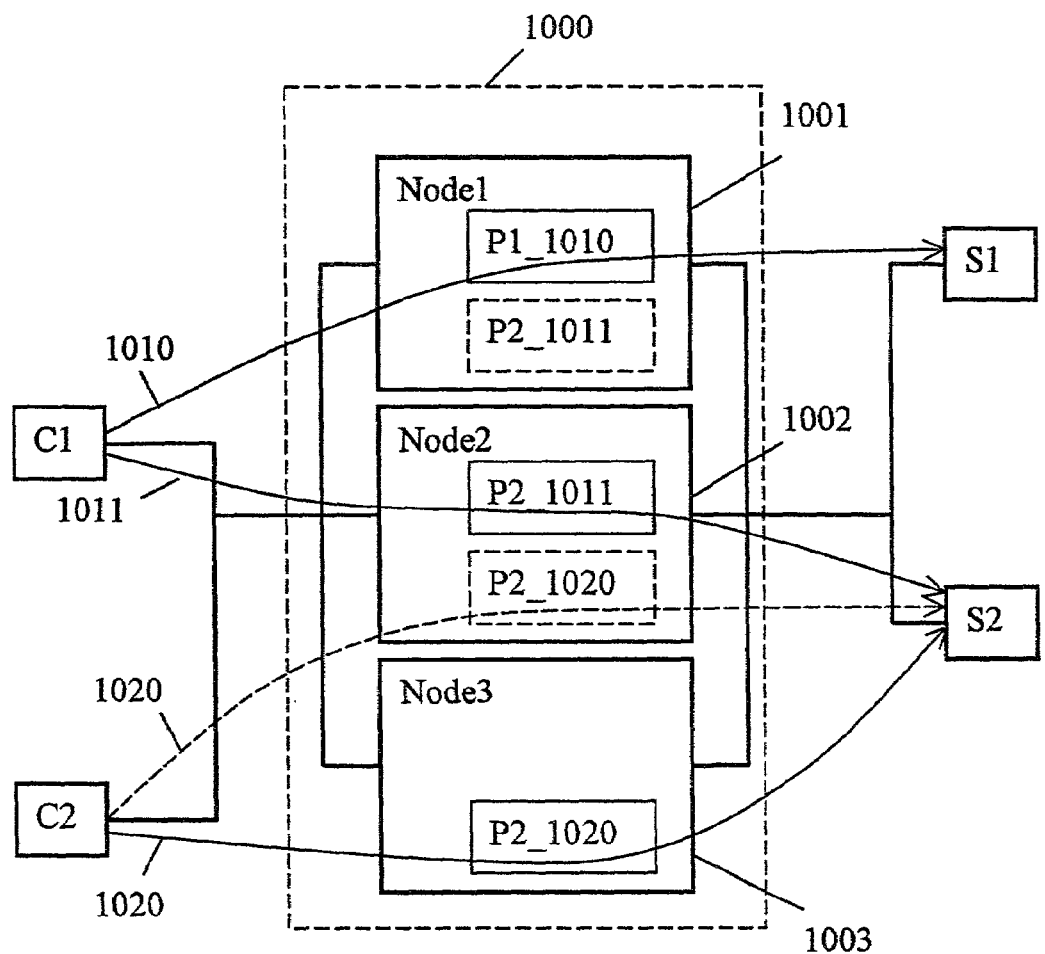
FIG. 10 illustrates as an example a network element cluster according to the invention and some communication connections going through the network element cluster.

FIG. 10 illustrates as an example a network element cluster 1000 according to the invention and some communication connections 1010, 1011 and 1020 going through the network element cluster. More specifically, the network element cluster is a security gateway cluster.

The security gateway cluster 1000 consists of three security gateway nodes 1001, 1002 and 1003. A client C1 has a protocol 1 connection 1010 to the server S1. The connection is handled by the node 1001 in the security gateway cluster 1000, and more specifically by a specific code portion P1_1010. The client C1 has also a protocol 2 connection 1011 to the server S2. The connection 1010 is handled by the node 1002 in the security gateway cluster 1000, and more specifically by a specific code portion P2_1011.

A client C2 has a protocol 2 connection 1020 to the server S2. The connection is first handled by the node 1003 in the security gateway cluster 1000, and more specifically by a specific code portion P2_1020. Then node 1003 initiates a procedure to go to offline state and the connection 1020 needs to be transferred to some other node, i.e. some other node needs to continue to handle the connection 1020 in order not to disconnect the connection. The connection 1020 is therefore transferred to node 1002. In order to enable the transfer information about the state of the connection 1020 is transferred from the node 1003 to the node 1002. Together with said state of the connection 1020 is transferred the state of the specific code portion P2_1020. The state of the specific code portion refers to the state concerning the specific connection 1020, i.e. the modification commands concerning the connection 1020, and logically the transfer of the state means that the specific code portion P2_1020 resides in the node 1002 after the transfer. Thus, the specific code portion P2_1020 continues to handle the connection 1020 in the node 1002 after the transfer. The dashed line and dashed square represent the connection 1020 and the specific code portion P2_1020 after the transfer. After the transfer two protocol 2 connections are going through the node 1002 and the node 1002 contains two specific code portions P2_1011 and P2_1020 handling protocol 2 connections.

It is possible, that also the whole code of the specific code portion P2_1020 is transferred with the connection dependent state of the specific code portion P2_1020. In that case, there is no need to have all possible specific code portions in all nodes.

In the node 1001, there is additionally a spare copy of the specific code portion P2_1011. The copy is an exact copy of the specific code portion P2_1011 in the node 1002 including the connection dependent state of the specific code portion P2_1011. The specific code portion P2_1011 in the node 1002 is copied to the node 1001 by taking a snap shot of the specific code portion P2_1011 in the node 1002 and transferring the snap shot to the node 1001. The snap shot may be taken for example after every considerable change in the connection dependent state of the specific code portion P2_1011 in the node 1002 or on timely basis, e.g. every 20 ms. The spare copy is not initially active in the node 1001. The spare copy becomes active only if the connection 1011 is transferred to the node 1001 for some reason. For example if the node 1002 fails, there may not be possibility to transfer the state of the connection 1011 and the state of the specific code portion P2_1011 from the node 1002 to the node 1001 before the node 1002 stops to operate. In this situation the node 1001 needs to be anyway able to continue handling the connection 1001, and the spare copy of the specific code portion P2_1011 together with state of the connection 1011 enables this.

The means illustrated in FIGS. 9 and 10 are typically implemented using a suitable combination of software and hardware. Such hardware typically comprises at least processing means and memory means. Some of the means presented in FIG. 9 or 10 may be implemented as single means supporting the functionality of those means: for example means 902 may be implemented as single means. FIGS. 9 and 10 present only examples of how to divide the functionality of a node according to the invention or a network element cluster according to the invention into separate functional blocks.

In view of the foregoing description it will be evident to a person skilled in the art that various modifications may be made within the scope of the invention. While preferred embodiments of the invention have been described in detail, it should be apparent that many modifications and variations thereto are possible, all of which fall within the scope of the invention.

The invention claimed is:

1. A method for handling data packets, said data packets belonging to a set of data packets, said method comprising:
    capturing data packets,
    accepting a captured data packet for processing based on said captured data packet and data packets captured prior to said captured data packet,
    when processing at least one captured data packet accepted for processing, determining a modification command affecting at least said at least one captured data packet,
    maintaining a list of modification commands, said list enabling modification of captured data packets,
    declining a captured data packet from processing if said captured data packet is already processed and modification commands induced by said captured data packet are already determined and maintained in said list of modification commands,
    modifying said captured data packet based on said list of modification commands, and
    releasing the modified captured data packet.

2. A method according to claim 1, wherein said data packets belonging to a set of data packets are first handled in a first node of a cluster of network elements and said list of modification commands is maintained in said first node, and in that said method further comprises the step of:
    transmitting said list of modification commands from said first node to a second node of said cluster of network elements.

3. A method according to claim 2, further comprising:
    after said transmission of said list, handling said set of data packets in said second node.

4. A method according to claim 3, further comprising:
    when beginning to handle said data packets, storing in said first node in a connection data structure an entry representing said set of data packets, and before handling said set of data packets in said second node, transmitting said entry from said first node to said second node.

5. A method according to claim 1 further comprising:
defining a plurality of first pieces of information which are to be replaced in the captured data packets with a plurality of corresponding second pieces of information,
and wherein, in the processing of captured data packets,
said first pieces of information are searched for, and
if a first piece of information is found, at least one modification command specifying at least the replacement of said first piece of information with a corresponding second piece of information is determined.

6. A method according to claim 5, wherein, if the length of said first piece of information is different from the length of said corresponding second piece of information and if said first piece of information is found in payload of data packet(s), said modification command comprises instructions for changing value of at least one header field in a data packet.

7. A method according to claim 1, wherein a modification command comprises:
a first identifier indicating the beginning of a first piece of information in the original captured data packets, the first piece of information being subject to be replaced by a second piece of information,
the length of the first piece of information, and
the second piece of information.

8. A method according to claim 1, wherein said data packets contain information fragments belonging to a sequence of information fragments, said method further comprising the steps of:
processing the information fragments of the captured data packets in the order specified by said sequence.

9. A method according to claim 8, wherein each information fragment of said sequence is processed only once.

10. A method according to claim 8, wherein said sequence of information fragments is a sequence of octets of data according to the Transfer Control Protocol.

11. A method for handling data packets, said data packets belonging to a set of data packets having at least partly hierarchical structure, said method comprising:
capturing data packets,
accepting a captured data packet for processing or declining a captured data packet from processing based on said captured data packet and data packets captured prior to said captured data packet,
said accepting comprising accepting data packets for processing in the order specified by said at least partly hierarchical structure
declining a captured data packet from processing if a data packet immediately preceding said captured data packet in said at least partly hierarchical structure is not yet captured,
delaying data packets declined from processing,
accepting a delayed data packet for processing and processing said delayed data packet, if data packet(s) immediately preceding said delayed data packet in said at least partly hierarchical structure is(are) already processed, and
releasing the delayed data packet.

12. A method according to claim 11, further comprising:
when processing at least one captured data packet, determining a modification command affecting said at least one captured data packet, and
maintaining a list of modification commands, said list enabling modification of captured data packets.

13. A method according to claim 12, further comprising:
modifying captured data packets based on said list of modification commands, and
releasing modified captured data packets.

14. A method according to claim 11, further comprising the step of discarding captured data packets that are declined from processing.

15. A method according to claim 11, wherein captured data packets that are declined from processing are delayed.

16. A method according to claim 11, further comprising:
declining a captured data packet from processing, if said captured data packet is already processed, and
releasing the captured data packet.

17. A method according to claim 11, comprising:
accepting a captured data packet for processing, if data packet(s) immediately preceding said captured data packet in said at least partly hierarchical structure is(are) already processed.

18. A method according to claim 11, comprising:
delaying data packets declined from processing,
accepting a captured data packet for processing,
accepting delayed data packet(s) for processing, if data packet(s) immediately preceding said delayed data packet(s) in said at least partly hierarchical structure is(are) accepted for processing,
processing said delayed data packet(s) together with said captured data packet, and
releasing the delayed and the captured data packets.

19. A method according to claim 11, wherein said at least partly hierarchical structure is a sequence of data packets.

20. A method according to claim 11, wherein in that said at least partly hierarchical structure is a hierarchically structured tree.

21. A method for handling data packets, said data packets belonging to a set of data packets and forming a plurality of groups of data packets, said method comprising:
capturing data packets,
declining a captured data packet belonging to a first group of data packets from processing, if all other data packets belonging to said first group of data packets are not yet captured, and delaying said captured data packet, and
processing a captured data packet belonging to a first group of data packets together with delayed data packets belonging to said first group of data packets if said captured data packet belonging to said first group and said delayed data packets belonging to said first group form a full first group of data packets.

22. A method according to claim 21, wherein said plurality of groups of data packets further belong to a set of groups having at least partly hierarchical structure, and further comprising
processing said groups of captured data packets in the order specified by said at least partly hierarchical structure.

23. A method for handling data packets, said data packets belonging to a set of data packets, said method comprising:
capturing data packets,
accepting a captured data packet for processing based on said captured data packet and data packets captured prior to said captured data packet,
when processing at least one captured data packet accepted for processing, determining a modification command affecting at least said at least one captured data packet, maintaining a list of modification commands, said list enabling modification of captured data packets,
wherein a modification command comprises
a first identifier indicating the beginning of a first piece of information in the original captured data packets, the first piece of information being subject to be replaced by a second piece of information,
the length of the first piece of information,
the second piece of information,
a second identifier indicating the beginning of the second piece of information in the modified captured data packets,
an offset between a third identifier indicating the end of the first piece of information in the original captured data packets and a fourth identifier indicating the end of the second piece of information in the modified captured data packets, and
the length of the second piece of information.

24. A method for handling data packets, said data packets belonging to a set of data packets, said method comprising:
capturing data packets, said data packets containing information fragments belonging to a sequence of information fragments,
declining a captured data packet from processing if a data packet containing the information fragment immediately preceding the information fragments of said captured data packet in said sequence is not yet captured, and
accepting a captured data packet for processing if a data packet containing the information fragment immediately preceding the information fragments of said captured data packet in said sequence is already processed, whereby each information fragment of said sequence is processed only once.

25. A computer readable medium having stored thereon computer readable code comprising the program code means recited below which, when executed by a computer, cause said computer to execute the functions recited below:
program code means for capturing data packets,
program code means for accepting a captured data packet for processing or declining a captured data packet from processing based on said captured data packet and data packets captured prior to said captured data packet,
program code means for handling said data packets belonging to a set of data packets first in a first node of a cluster of network elements and for maintaining said list of modification commands in said first node, said list enabling modification of captured data packets,
program code means for transmitting said list of modification commands from said first node to a second node of a cluster of network elements,
program code means for declining a captured data packet from processing if said captured data packet is already processed and modification commands induced by said captured data packet are already determined and maintained in said list of modification commands,
program code means for modifying said captured data packet based on said list of modification commands, and
program code means for releasing the modified captured data packet.

26. A computer readable medium according to claim 25, further comprising program code means stored on said medium which, when executed by a computer, control said computer to perform the additional functions recited below:
program code means for modifying captured data packets based on said list of modification commands, and
program code means for releasing modified captured data packets.

27. A computer readable medium having stored thereon computer readable code comprising the program code means recited below which, when executed by a computer, cause said computer to execute the functions recited below:
program code means for capturing data packets;
program code means for accepting a captured data packet for processing or declining a captured data packet from processing based on said captured data packet and data packets captured prior to said captured data packet;
program code means for processing received data packets first in a first node of a cluster of network nodes, if said data packets belong to said set of data packets;
program code means for determining a modification command affecting at least received data, as a response to processing said data;
said program code means for outputting said modification command;
program code means for maintaining said list of modification commands in said first node, said list enabling modification of captured data packets;
program code means for transmitting said list of modification commands from said first node to a second node of said cluster of network elements;
program code means for processing said set of data packets in said second node after said transmission of said list of modification commands from said first node to said second node;
program code means for declining a captured data packet from processing if said captured data packet is already processed and modification commands induced by said captured data packet are already determined and maintained in said list of modification commands;
program code means for modifying said captured data packet based on said list of modification commands; and
program code means for releasing the modified captured data packet.

28. A network element for handling data packets in a cluster of network elements, said data packets belonging to a set of data packets, said network element programmed with computer code means recited below which control said network element to perform the functions recited below;
means for capturing data packets,
means for accepting a captured data packet for processing or declining a captured data packet from processing based on said captured data packet and data packets captured prior to said captured data packet,
means for maintaining a list of modification commands, said list enabling modification of captured data packets, and
means for transmitting said list of modification commands to a second network element of said cluster of network elements,
means for declining a captured data packet from processing if said captured data packet is already processed and modification commands induced by said captured data packet are already determined and maintained in said list of modification commands,
means for modifying said captured data packet based on said list of modification commands, and
means for releasing the modified captured data packet.

29. A network element according to claim 28, further comprising program code means recited below which control said network element to perform the functions recited below:

means for processing a captured data packet, and means for determining a modification command affecting at least one captured data packet as a response to processing said at least one captured data packet.

30. A network element cluster comorised of a plurality of nodes for handling data packets, said data packets belonging to a set of data packets, at least one node of said network element cluster including program code which programs said node to provide the following structural elements:

means for capturing data packets, means for accepting a captured data packet for processing or declining a captured data packet from processing based on said captured data packet and data packets captured prior to said captured data packets, means for maintaining a list of modification commands, said list enabling modification of captured data packets, means for transmitting said list of modification commands from said node to another node of said cluster of network elements, means for declining a captured data packet from processing, if said captured data packet is already processed and modification commands induced by said captured data packet are already determined and maintained in said list of modification commands, means for modifying said captured data packet based on said list of modification commands, and means for releasing the modified captured data packet.

31. A computer readable medium storing program code which, when executed by a computer, controls said computer to handle data packets, said data packets belonging to a set of data packets, said program code comprising:

program code configured to control said computer to capture data packets, program code configured to control said computer to accept a captured data packet for processing based on said captured data packet and data packets captured prior to said captured data packet, program code configured to control said computer to, when processing at least one captured data packet accepted for processing, determine a modification command affecting at least said at least one captured data packet, program code configured to control said computer to maintain a list of modification commands, said list enabling modification of captured data packets, program code configured to control said computer to decline a captured data packet from processing, if said captured data packet is already processed and modification commands induced by said captured data packet are already determined and maintained in said list of modification commands, program code configured to control said computer to modify said captured data packet based on said list of modification commands, and program code configured to control said computer to release the modified captured data packet.

32. A computer-readable medium storing program code which, when executed by a computer, controls said computer to handle data packets, said data packets belonging to a set of data packets having at least partly hierarchical structure, said program code comprising:

program code configured to control said computer to capture data packets, program code configured to control said computer to accept a captured data packet for processing or declining a captured data packet from processing based on said captured data packet and data packets captured prior to said captured data packet such that data packets are accepted for processing in the order specified by said at least partly hierarchical structure program code configured to control said computer to decline a captured data packet from processing, if a data packet immediately preceding said captured data packet in said at least partly hierarchical structure is not yet captured, program code configured to control said computer to delay data packets declined from processing, program code configured to control said computer to accept a delayed data packet for processing and processing said delayed data packet, if data packet(s) immediately preceding said delayed data packet in said at least partly hierarchical structure is(are) already processed, and program code configured to control said computer to release the delayed data packet.

33. A computer-readable medium storing program code, which when executed by a computer, controls said computer to handle data packets, said data packets belonging to a set of data packets and forming a plurality of groups of data packets, said program code comprising:

program code configured to control said computer to capture data packets, program code configured to control said computer to decline a captured data packet belonging to a first group of data packets from processing if all other data packets belonging to said first group of data packets are not yet captured, and delaying said captured data packet, and program code configured to control said computer to process a captured data packet belonging to a first group of data packets together with delayed data packets belonging to said first group of data packets if said captured data packet belonging to said first group and said delayed data packets belonging to said first group form a full first group of data packets.

34. A computer-readable medium storing program code which, when executed by a computer, causes said computer to handle data packets, said data packets belonging to a set of data packets and forming a plurality of groups of data packets, said program code comprising:

program code configured to control said computer to capture data packets, said data packets containing information fragments belonging to a sequence of information fragments, program code configured to control said computer to decline a captured data packet from processing, if a data packet containing the information fragment immediately preceding the information fragments of said captured data packet in said sequence is not yet captured, and program code configured to control said computer to accept a captured data packet for processing if a data packet containing the information fragment immediately preceding the information fragments of said captured data packet in said sequence is already processed, whereby each information fragment of said sequence is processed only once.

35. A network element for handling data packets, said network element comprising a machine whose functions are at least partially controlled by program code, said program code comprising:

program code configuring said network element to capture data packets, said data packets belonging to a set of data packets, program code configuring said network element to accept a captured data packet for processing based on said captured data packet and data packets captured prior to said captured data packet, program code configuring said network element to, when processing at least one captured data packet accepted for processing, determine a modification command affecting at least said at least one captured data packet, program code configuring said network element to maintain a list of modification commands, said list enabling modification of captured data packets, program code configuring said network element to decline a captured data packet from processing if said captured data packet is already processed and modification commands induced by said captured data packet are already determined and maintained in said list of modification commands, program code configuring said network element to modify said captured data packet based on said list of modification commands, and program code configuring said network element to release the modified captured data packet.

36. A network element for handling data packets, said network element comprising a machine whose functions are at least partially controlled by program code, said program code comprising:

program code configuring said network element to capture data packets, said data packets belonging to a set of data packets having at least partly hierarchical structure, program code configuring said network element to accept a captured data packet for processing or declining a captured data packet from processing based on said captured data packet and data packets captured prior to said captured data packet such that data packets are accepted for processing in the order specified by said at least partly hierarchical structure program code configuring said network element to decline a captured data packet from processing if a data packet immediately preceding said captured data packet in said at least partly hierarchical structure is not yet captured, program code configuring said network element to delay data packets declined from processing, program code configuring said network element to accept a delayed data packet for processing and processing said delayed data packet if data packet(s) immediately preceding said delayed data packet in said at least partly hierarchical structure is(are) already processed, and program code configuring said network element to release the delayed data packet.

37. A network element for handling data packets, said network element comprising a machine whose functions are at least partially controlled by program code, said program code comprising:

program code configuring said network element to capture data packets, said data packets belonging to a set of data packets and forming a plurality of groups of data packets, program code configuring said network element to decline a captured data packet belonging to a first group of data packets from processing if all other data packets belonging to said first group of data packets are not yet captured, and delaying said captured data packet, and program code configuring said network element to process a captured data packet belonging to a first group of data packets together with delayed data packets belonging to said first group of data packets if said captured data packet belonging to said first group and said delayed data packets belonging to said first group form a full first group of data packets.

38. A network element for handling data packets, said network element comprising a machine whose functions are at least partially controlled by program code, said program code comprising:

program code configuring said network element to capture data packets, said data packets belonging to a set of data packets and forming a plurality of groups of data packets and containing information fragments belonging to a sequence of information fragments, program code configuring said network element to decline a captured data packet from processing if a data packet containing the information fragment immediately preceding the information fragments of said captured data packet in said sequence is not yet captured, and program code configuring said network element to accept a captured data packet for processing if a data packet containing the information fragment immediately preceding the information fragments of said captured data packet in said sequence is already processed, whereby each information fragment of said sequence is processed only once.

* * * * *